United States Patent
Sonoda et al.

(10) Patent No.: US 11,365,504 B2
(45) Date of Patent: Jun. 21, 2022

(54) WASHING MACHINE

(71) Applicant: Samsung Electronics Co., Ltd., Suwon-si (KR)

(72) Inventors: Yasuyuki Sonoda, Yokohama (JP); Yukinori Nakagawa, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 16/744,627

(22) Filed: Jan. 16, 2020

(65) Prior Publication Data

US 2020/0232143 A1 Jul. 23, 2020

(30) Foreign Application Priority Data

Jan. 17, 2019 (JP) .............................. JP2019-006280
Feb. 5, 2019 (JP) .............................. JP2019-018807
Dec. 30, 2019 (KR) ........................ 10-2019-0177789

(51) Int. Cl.
| | |
|---|---|
| *D06F 33/00* | (2020.01) |
| *D06F 33/34* | (2020.01) |
| *D06F 34/28* | (2020.01) |
| *D06F 37/04* | (2006.01) |
| *D06F 37/22* | (2006.01) |
| *D06F 37/30* | (2020.01) |
| *D06F 37/36* | (2006.01) |
| *D06F 37/40* | (2006.01) |
| *H02K 7/108* | (2006.01) |
| *H02K 7/116* | (2006.01) |

(Continued)

(52) U.S. Cl.
CPC .............. *D06F 37/40* (2013.01); *D06F 33/00* (2013.01); *D06F 33/34* (2020.02); *D06F 34/28* (2020.02); *D06F 37/22* (2013.01); *D06F 37/304* (2013.01); *D06F 37/36* (2013.01); *H02K 7/1085* (2013.01); *H02K 7/116* (2013.01); *H02K 7/14* (2013.01); *H02K 21/22* (2013.01); *D06F 37/04* (2013.01); *D06F 2103/04* (2020.02); *D06F 2105/02* (2020.02)

(58) Field of Classification Search
None
See application file for complete search history.

(56) References Cited

U.S. PATENT DOCUMENTS

| | | |
|---|---|---|
| 6,148,646 A | 11/2000 | Koshiga et al. |
| 6,332,343 B1 | 12/2001 | Koketsu et al. |

(Continued)

FOREIGN PATENT DOCUMENTS

| | | |
|---|---|---|
| JP | 2001000778 A | 1/2001 |
| JP | 2006517126 A | 7/2006 |

(Continued)

OTHER PUBLICATIONS

International Search Report dated May 15, 2020, issued in International Application No. PCT/KR2020/000818.

(Continued)

*Primary Examiner* — Levon J Shahinian
(74) *Attorney, Agent, or Firm* — Jefferson IP Law, LLP

(57) ABSTRACT

A washing machine and a driver (e.g., a drive unit) suitable for the washing machine are provided. The driver includes a motor to rotate a shaft supported by a unit base, and a reducer interposed between the shaft and the motor. The motor and the reducer are integrally formed to be aligned in a line along a direction perpendicular to a rotation axis.

18 Claims, 21 Drawing Sheets

(51) Int. Cl.
*H02K 7/14* (2006.01)
*H02K 21/22* (2006.01)
*D06F 105/02* (2020.01)
*D06F 103/04* (2020.01)

(56) References Cited

U.S. PATENT DOCUMENTS

| | | |
|---|---|---|
| 2004/0139768 A1 | 7/2004 | Kim et al. |
| 2016/0130739 A1 | 5/2016 | Song |
| 2017/0321776 A1 | 11/2017 | Bauer et al. |
| 2018/0237975 A1 | 8/2018 | Chupka |

FOREIGN PATENT DOCUMENTS

| | | |
|---|---|---|
| JP | 2010240006 A | 10/2010 |
| JP | 2011185311 A | 9/2011 |
| JP | 2017099605 A | 6/2017 |
| JP | 2017222251 A | 12/2017 |
| JP | 6282492 B2 | 2/2018 |
| KR | 10-2000-0063005 A | 10/2000 |
| KR | 10-2016-0035877 A | 4/2016 |
| KR | 10-2016-0041614 A | 4/2016 |
| KR | 10-1812032 B1 | 12/2017 |
| KR | 10-2019-0089616 A1 | 7/2019 |
| WO | 2015/005752 A1 | 1/2015 |
| WO | 2015/161579 A1 | 10/2015 |

OTHER PUBLICATIONS

European Search Report dated Dec. 10, 2021; European Appln. No. 20741314.7-1201 / 3877581 PCT/KR2020000818.

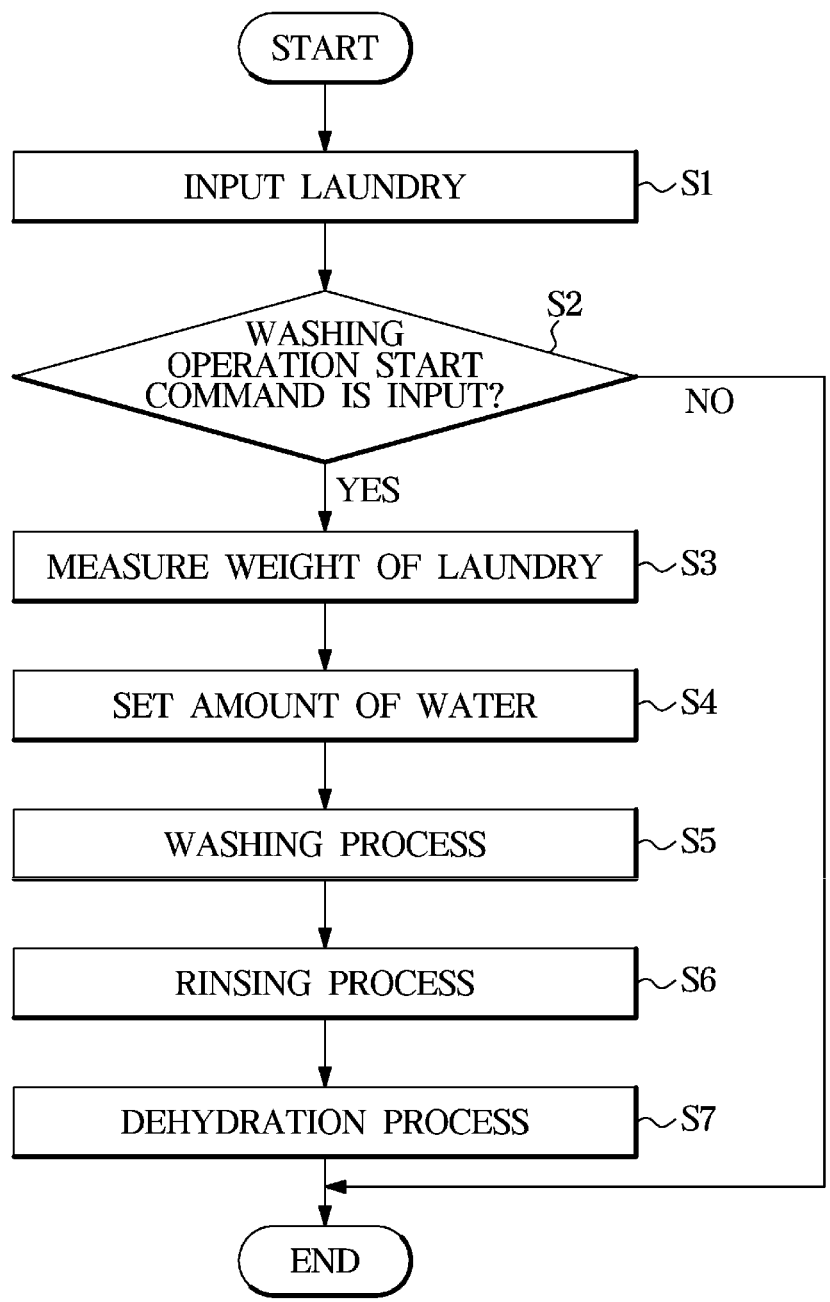

WASHING MACHINE

CROSS-REFERENCE TO RELATED APPLICATION(S)

This application is based on and claims priority under 35 U.S.C. § 119 of a Korean patent application number 10-2019-0177789, filed on Dec. 30, 2019, in the Korean Intellectual Property Office, which claims the benefit of Japanese patent application number 2019-006280, filed on Jan. 17, 2019, in the Japan Patent Office, and of a Japanese patent application number 2019-018807, filed on Feb. 05, 2019, in the Japan Patent Office, the disclosure of each of which is incorporated by reference herein in its entirety.

BACKGROUND

1. Field

The disclosure relates to a drive unit suitable for a washing machine and a washing machine having the same.

2. Description of Related Art

Various kinds of washing machines are currently commercialized. The washing machines may be roughly classified into a vertical type washing machine that rotates a rotating tub storing laundry in a vertical axis direction (i.e., a top loading washing machine), and a drum type washing machine that rotates a rotating tub storing laundry in a horizontal axis direction or in an inclined direction. In the trend, the drum type washing machine has become popular. These washing machines are all driven by a motor.

In the case of a drum type washing machine, a series of washing processes such as washing, rinsing, and dehydration are performed by rotating the drum storing the laundry. In the washing or rinsing process for rotating the laundry containing a large amount of water, a high torque rotational force at a low speed is required. In the dehydration process for rotating the laundry to make the laundry contain little water, a low torque rotational force at a high speed is required.

Therefore, the motor for driving the washing machine needs to cope with this rotational force. For this purpose, reducers and clutches are generally used. For example, it is possible to decelerate through a pulley and a belt between a motor and an output shaft, or through a plurality of gears, such as a planetary gear mechanism. In addition, driving states may be switched by interposing a clutch.

Examples of such a reducer and a clutch are disclosed in patent documents 1~4 of the related art. As for the reducer and clutch disclosed in patent documents, the reducer and the clutch switch two output shafts, the clutch is arranged on the outside of the motor, or the reducer and the clutch are arranged side by side in the axial direction.

The above-mentioned washing machine is a washing machine in which a motor indirectly drives a drive object (i.e., indirect type drive type), which is different from a washing machine in which a motor directly drives a drive object (i.e., direct type drive type). Instead of the reducer and clutch, inverter control is performed in the direct type washing machine.

According to the technique disclosed, patent document 5 discloses a clutch configured to perform switching by sliding a slider by using an electromagnetic force. However, the slider of this document has an adsorber of a metallic material, and the sliding against the elastic force of a spring is performed by adsorbing this adsorber by using the electromagnetic force.

The clutch of patent document 5 generates an electromagnetic force by supplying electric power at all times in order to maintain the slider at a predetermined position.

RELATED ART DOCUMENTS

[Patent Document 1] Japanese Patent Application Laid-Open No. 2001-778
[Patent Document 2] Japanese Patent Application Laid-Open No. 2006-517126
[Patent Document 3] Japanese Patent Application Laid-Open No. 2017-99605
[Patent Document 4] Japanese Patent Application Laid-Open No. 2010-240006
[Patent Document 5] Japanese Patent Application Laid-Open No. 2001-017778

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure to provide a drive unit suitable for driving a washing machine by efficiently combining the direct drive method and the indirect drive method.

As for a washing machine, the large capacity and the low noise with the compact size are needed and further the washing machine is needed to be energy saving.

As for a direct drive type washing machine, it is needed to control a rotational force having a large speed difference or torque difference and to output the rotational force to a single motor having the same magnetic configuration. Therefore, it is needed to drive the motor in a greatly different rotational state and thus it is difficult to maintain an optimal rotational performance state. In addition, it is needed for the motor itself to have a large size so as to cope with such rotation performance state.

On the other hand, as for an indirect drive type washing machine, a reducer or a clutch is interposed between a drive target and a motor. Therefore, a large space for installing the reducer and the clutch is needed, which causes the limitation in the washing capacity. In addition, the mechanical structure is complicated, such as two output shafts. The complicated structure may cause the large noise.

Both the direct drive method and the indirect drive method have strengths and weaknesses, respectively.

Additional aspects will be set forth in part in the description which follows and, in part, will be obvious from the description, or may be learned by practice of the presented embodiments.

In accordance with an aspect of the disclosure, a driver (e.g., a drive unit) for a washing machine is provided. The driver includes a unit base, a shaft supported on the unit base in a state rotatable about a rotation axis, a motor to rotate the shaft, and a reducer interposed between the shaft and the motor. The motor and the reducer are integrally formed to be aligned in a line in a direction substantially perpendicular to the rotation axis.

According to the driver, a rotational force of the motor may be output from one shaft, Therefore, it is possible to simplify the structure. The motor and the reducer are integrally formed to be aligned in a line in a direction substantially perpendicular to the rotation axis. Accordingly, the driver may become thinner, and thus the entire driver may be made compact. A washing capacity may be increased, so it is suitable for a washing machine.

The term "aligned in a line" refers to an arrangement in the case of viewing the longitudinal section of the drive unit, and includes not only the objects lined up in a straight line, but also the cases in which the objects line up in a misaligned state with a certain degree. It is required that at least a part of each object just overlap in a column direction.

Particularly, the motor may include a rotor rotatably supported about the rotation axis, and a stator fixed to the unit base to face the rotor with a predetermined gap. The reducer may include a carrier fixed to the shaft, a sun gear configured to pivot about the rotation axis, an internal gear arranged around the sun gear, and a plurality of planetary gears rotatably supported by the carrier to be arranged between the sun gear and the internal gear so as to be engaged with the sun gear and the internal gear. The rotor, the stator, the sun gear, the plurality of planetary gears, and the internal gear may be aligned in a line substantially perpendicular to the rotation axis.

Further, because the rotor is rotatably supported on the shaft through a rotor bearing portion, the rotor, the stator, the sun gear, the plurality of planetary gears, the internal gear and the rotor bearing portion may be aligned in a line substantially perpendicular to the rotation axis.

In accordance with another aspect of the disclosure, a driver includes a unit base, a shaft supported on the unit base in a state rotatable about a rotation axis, a motor to rotate the shaft, and a reducer and a clutch interposed between the shaft and the motor. The motor and the clutch are integrally formed to be aligned in a line in a direction substantially perpendicular to the rotation axis.

The motor and the reducer may be integrally formed to be aligned in a line in a direction substantially perpendicular to the rotation axis. Accordingly, the drive driver may become thinner, and thus the entire driver may be made compact. A washing capacity may be increased, so it is suitable for a washing machine.

Particularly, the motor may include a rotor rotatably supported about the rotation axis, and a stator fixed to the unit base to face the rotor with a predetermined gap. The clutch may include a movable portion slidable in a rotation axis direction, and a pair of fixed portions spaced apart in the rotation axis direction. By connecting the movable portion to any one of the fixed portion, the clutch may switch a mode into a first mode in which the motor rotates the shaft through the reducer, and a second mode in which the motor rotates the shaft without using the reducer. The rotor, the stator, the sun gear, the movable portion and the fixed portion may be aligned in a line substantially perpendicular to the rotation axis.

In accordance with another aspect of the disclosure, a driver is provided. The driver includes a unit base, a shaft supported on the unit base in a state rotatable about a rotation axis, a motor to rotate the shaft, and a reducer and a clutch interposed between the shaft and the motor. The reducer and the clutch are integrally formed to be aligned in a line in a direction substantially perpendicular to the rotation axis.

The reducer and the clutch may be integrally formed to be aligned in a line in a direction substantially perpendicular to the rotation axis, Accordingly, the drive unit may become thinner, and thus the entire drive unit may be made compact. A washing capacity may be increased, so it is suitable for a washing machine Particularly, the reducer may include a carrier fixed to the shaft, a sun gear to pivot about the rotation axis, an internal gear arranged around the sun gear, and a plurality of planetary gears rotatably supported by the carrier to be arranged between the sun gear and the internal gear so as to be engaged with the sun gear and the internal gear. The clutch may include a movable portion slidable in a rotation axis direction, and a pair of fixed portions spaced apart in the rotation axis direction. By connecting the movable portion to any one of the fixed portion, the clutch may switch a mode into a first mode in which the motor rotates the shaft through the reducer, and a second mode in which the motor rotates the shaft without using the reducer. The sun gear, the plurality of planetary gears, the internal gear, the movable portion and the fixed portion may be aligned in a line substantially perpendicular to the rotation axis.

In accordance with another aspect of the disclosure, a driver includes a unit base, a shaft supported on the unit base in a state rotatable about a rotation axis, a motor to rotate the shaft, and a reducer and a clutch interposed between the shaft and the motor. The motor, the reducer and the clutch are integrally formed to be aligned in a line in a direction substantially perpendicular to the rotation axis.

The motor, the reducer and the clutch may be integrally formed to be aligned in a line in a direction substantially perpendicular to the rotation axis. Accordingly, the driver may become thinner, and thus the entire driver may be made compact. A washing capacity may be increased, so it is suitable for a washing machine.

Particularly, the motor may include a rotor rotatably supported about the rotation axis, and a stator fixed to the unit base to face the rotor with a predetermined gap. The reducer may include a carrier fixed to the shaft, a sun gear to pivot about the rotation axis, an internal gear arranged around the sun gear, and a plurality of planetary gears rotatably supported by the carrier to be arranged between the sun gear and the internal gear so as to be engaged with the sun gear and the internal gear. The clutch may include a movable portion slidable in a rotation axis direction, and a pair of fixed portions spaced apart in the rotation axis direction. By connecting the movable portion to any one of the fixed portion, the clutch may switch a mode into a first mode in which the motor rotates the shaft through the reducer, and a second mode in which the motor rotates the shaft without using the reducer. The rotor, the stator, the sun gear, the plurality of planetary gears, the internal gear, the movable portion, and the fixed portion may be aligned in a line substantially perpendicular to the rotation axis.

Further, because the rotor is rotatably supported on the shaft through a rotor bearing portion, the rotor, the stator, the sun gear, the plurality of planetary gears, the internal gear, the movable portion, the fixed portion and the rotor bearing portion may be aligned in a line substantially perpendicular to the rotation axis.

As for the driver, the rotor may include a plurality of magnets, and the plurality of magnets may face an outer circumferential portion of the stator.

As for the driver, the rotor may include a cylindrical rotor case formed in such a way that a height of a circumferential wall is smaller than a radius of a bottom wall and a bottom has a center coinciding with the rotation axis. The rotor, the stator, the sun gear, the plurality of planetary gears, the internal gear, the movable portion, the fixed portion and the rotor bearing portion may be accommodated in the rotor case.

Therefore, almost all of the driver may be accommodated in the rotor case of the motor, and thus the driver may be more compact.

As for the driver, the rotor case may further include a shaft support to be supported by the rotor bearing portion, and the shaft support may serve as the sun gear.

Therefore, the driver may be configured more efficiently by sharing the members

In accordance with another aspect of the disclosure, a washing machine is provided. The washing machine includes a fixed tub installed inside a body, a rotating tub rotatably disposed in the fixed tub to accommodate laundry, and the above-mentioned drive unit.

The unit base may be installed on a bottom of the fired tub, the shaft passing through the bottom of the fixed tub may be fixed to the rotating tub and thus the rotating tub may be rotated about the rotation axis.

That is, the compact driver mentioned above may be used for the washing machine and particularly the driver may be installed on the bottom of the fixed tub so as to rotate the rotating tub. Therefore, the capacity of the fixed tub and the rotating tub may be enlarged.

The washing machine may further include at least one processor configured to perform at least each process of washing, rinsing, and dehydration, by controlling the driver and the at least one processor may switch a mode into the first mode in the washing and rinsing process and switches a mode into the second mode in the dehydration process.

Accordingly, by the driver, it is possible to output the rotational force corresponding to each process performed by the washing machine and thus it is possible to operate efficiently.

As for the washing machine, the rotation axis may be arranged to extend in a direction that is inclined with respect to the horizontal direction or in a substantially horizontal direction.

The embodiment may be applied to the drum type washing machine Because as for the drum type washing machine, the output of a driving force is applied to only a drum, it is suitable for the drive unit mentioned above. It is possible to realize a washing machine with ease and convenience.

In accordance with another aspect of the disclosure, a driver is provided, The driver includes a shaft, a motor to rotate the shaft, a clutch interposed between the shaft and the motor, and a reducer configured to use a planetary gear mechanism. The clutch includes a movable portion slidable in a rotation axis direction, a pair of fixed portions spaced apart in the rotation axis direction, and an actuator to switch a connection state of the reducer by connecting the movable portion to any one of the fixed portion by sliding the movable portion. The actuator includes a movable element provided in the movable portion and including a clutch magnet, and a fixed element arranged to face the movable element with a gap therebetween in a diameter direction and including a clutch coil and a clutch yoke. The clutch magnet includes a plurality of magnetic poles arranged in the rotation axis direction.

Particularly, the driver may be configured as follows.

In accordance with another aspect of the disclosure, a driver includes a unit base, a shaft supported on the unit base in a state rotatable about a rotation axis, a motor to rotate the shaft, and a reducer and a clutch interposed between the shaft and the motor.

The motor may include a rotor rotatably supported about the rotation axis, and a stator fixed to the unit base to face the rotor with a predetermined gap.

The reducer may include a carrier fixed to the shaft, a sun gear to pivot about the rotation axis, an internal gear arranged around the sun gear, and a plurality of planetary gears rotatably supported by the carrier to be arranged between the sun gear and the internal gear so as to be engaged with the sun gear and the internal gear.

The clutch may include a movable portion slidable in a rotation axis direction, a pair of fixed portions including first and second fixed portions spaced apart in the rotation axis direction, and an actuator to slide the movable portion. The clutch may be configured to be switchable between a first mode in which the motor rotates the shaft through the reducer as the movable portion is connected to the first fixed portion, and a second mode in which the motor rotates the shaft without using the reducer as the movable portion is connected to the second fixed portion.

The actuator may include a movable element provided in the movable portion and including a clutch magnet, and a fixed element arranged to face the movable element with a gap therebetween in a diameter direction and including a clutch coil and a clutch yoke. The clutch magnet may include a plurality of magnetic poles arranged in the rotation axis direction.

According to this driver, the clutch and the reducer may be provided between the shaft and the motor outputting a driving force. That is, because the clutch and the reducer are integrally formed, the entire unit may be made compact. It is possible to perform two types output such as decelerated output and output without deceleration, using a single shaft. Therefore, it is suitable for the washing machine to perform a washing process or a dehydration process.

The clutch may switch the connection state of the reducer by sliding the movable portion where the movable element of the actuator is installed in the rotation axis direction. Because the movable portion includes a clutch magnet having a plurality of magnetic poles arranged in the rotation axis direction, the movable portion may be slid by supplying a current to the clutch coil of the fixed element. Further, it is possible to maintain the connection state of the movable portion due to the action of the electromagnetic force acting between the clutch yoke and the clutch magnet.

Therefore, the electric power consumption may be suppressed because a current is supplied to the clutch coil only when the clutch is switched.

A first stable point magnetically stabilized on any one side of the connecting portion of the movable portion and the fixed portion and a second stable point magnetically stabilized on the other side of the connection portion may be generated when a current is not supplied to the clutch coil.

Particularly, it is appropriate that the clutch magnet includes three magnetic poles, and the clutch yoke includes end magnetic poles positioned at both ends of the magnetic poles and a pair of magnetic pole facing portion provided to face to each other.

Therefore, the connection state of the movable portion nay be maintained more stably.

In the washing machine, the fixed portion may include a fixed side protruding in the rotation axis direction, and the movable portion may include a pair of movable side protrusions engaged with the fixed side protrusion when being connected to the fixed portion. The washing machine may further include a position selector to position the fixed portion and the movable portion on a predetermined position in the circumferential direction in which the fixed side protrusion is engaged with the movable side protrusion.

Because the fixed portion and the movable portion are connected by the engagement of the fixed side protrusion and the movable side protrusion, such a stable connection state may be secured by a simple configuration. Because the position selector is provided, the fixed portion and the movable portion may be smoothly engaged with each other even when the movable side protrusion is shifted in the circumferential direction with respect to the fixed side protrusion.

The washing machine may further include an impact absorbing member to reduce an impact at the time of connection to the connection portion of the movable portion and the fixed portion.

The movable portion may be slid and then connected to the fixed portion. Therefore, at the time of connection, an unpleasant impact sound may occur according to this contact. On the other hand, when the impact absorbing member, such as an elastic member or a vibration damping member, is provided at the connection portion of the movable portion and the fixed portion, the impact sound may be reduced.

The washing machine may further include at least one processor configured to control the motor and the clutch. The at least one processor may include a motor controller configured to control driving of the motor, and a clutch controller configured to control driving of the clutch. The clutch controller and the motor controller may share a control circuit.

Therefore, it is possible to prevent an increase in the number of components, such as a semiconductor element, and thus the washing machine may be implemented at low cost.

Immediately before the clutch controller supplies a predetermined switching current to the clutch to connect the movable portion to the fixed portion, the clutch controller may supply an impact relaxation current, which is an opposite direction to the switching current, to the clutch.

Therefore, the impact sound may be simply reduced without performing structural studies.

In accordance with another aspect of the disclosure, a washing machine is provided. The washing machine includes a body, a fixed tub installed inside the body, a rotating tub rotatably disposed in the fixed tub to accommodate laundry, and a driver configured to rotate the rotating tub. The driver includes a shaft connected to a bottom of the rotating tub to rotate the rotating tub about a rotation axis, a motor including a stator and a rotor rotatable through interaction with the stator, a reducer to connect the rotor to the shaft to rotate the shaft, and a clutch switchable between a first mode in which the motor reduces a speed through the reducer and then the motor rotates the shaft at a reduced speed, and a second mode in which the motor rotates the shaft without reducing the speed. The reducer and the clutch are arranged between the shaft and the motor.

The reducer, the clutch, and the motor may be arranged in a lime along a direction perpendicular to the rotation axis.

The rotor may include a rotor case and a plurality of magnets. The plurality of magnets may be arranged to face an outer circumferential portion of the stator.

The rotor case may include a disk-shaped bottom wall in which a center thereof coincides with the rotation axis, and a cylindrical circumferential wall extending around the bottom wall. The stator, the reducer, and the clutch may be accommodated in the rotor case.

The rotor case may include a shaft support rotatably supported on the shaft through a rotor bearing portion.

The washing machine may further include at least one processor configured to perform at least each process of washing, rinsing, and dehydration, by controlling the driver, and the at least one processor may be further configured to control the clutch to switch into the first mode in the washing and rinsing process, and control the clutch to switch into the second mode in the dehydration process.

The reducer may include a carrier fixed to the shaft, a sun gear to pivot about the rotation axis, an internal gear arranged around the sun gear, and a plurality of planetary gears rotatably supported by the carrier to be arranged between the sun gear and the internal gear so as to be engaged with the sun gear and the internal gear.

The clutch may include a movable portion slidable in a rotation axis direction, a pair of fixed portions spaced apart in the rotation axis direction, and an actuator to switch the mode between the first mode and the second mode by connecting the movable portion to any one of the pair of fixed portions.

The pair of fixed portions may include a first fixed portion fixed to the stator and a second fixed portion fixed to the rotor The movable portion may be formed of a cylindrical member having a diameter larger than that of the internal gear, and may be arranged on the outside of the internal gear to be slidable in the rotation axis direction.

The pair of fixed portions each may include a pair of locking protrusions protruding in the rotation axis direction, and the movable portion may include a pair of hooking protrusions formed to be spaced apart in the rotation axis direction to be engaged with the pair of locking protrusions.

The actuator may include a movable element provided on the movable portion and including a clutch magnet, and a fixed element provided to face the movable element with a gap therebetween in a diameter direction and including a clutch coil and a clutch yoke. The clutch magnet may include a plurality of magnetic poles arranged in the rotation axis direction.

A first stable point, in which the movable element is magnetically stabilized on any one side of a connection portion where the movable portion is connected to the fixed portion, and a second stable point, in which the movable element is magnetically stabilized on the other side of the connection portion, may be generated when a current is not supplied to the clutch coil.

The clutch may include a position selector to allow the fixed portion and the movable portion to be placed on a predetermined position in a circumferential direction where the locking protrusion is engaged with the hooking protrusion.

The washing machine may further include at least one processor configured to control the motor and the clutch. The at least one processor may include a motor controller configured to control driving of the motor, and a clutch controller configured to control driving of the clutch. Immediately before the clutch controller supplies a predetermined switching current to the clutch to connect the movable portion to the fixed portion, the clutch controller may supply an impact relaxation current, which is an opposite direction to the switching current, to the clutch.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 12A is a flow chart illustrating a basic operation of the washing machine according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

<Washing Machine>

Figure 1:
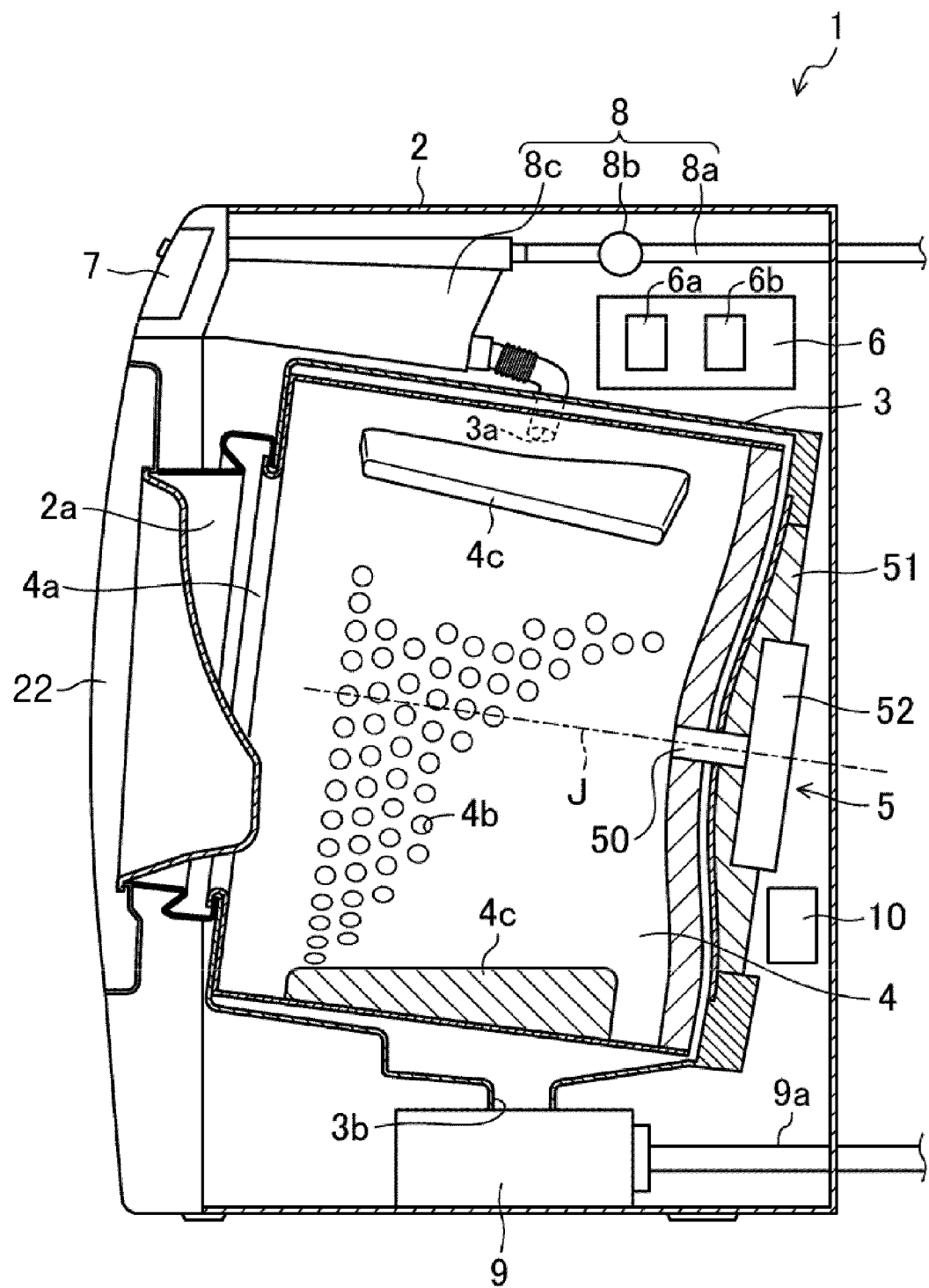
FIG. 1 is a schematic view illustrating a structure of a washing machine to which a disclosed technique is applied according to an embodiment of the disclosure.

FIG. 1 is a schematic view illustrating a structure of a washing machine 1 to which a disclosed technique is applied according to an embodiment of the disclosure.

Referring to FIG. 1, the washing machine 1 is a drum type washing machine. Further, the washing machine 1 is an automatic washing machine configured to automatically perform a series of process related to a washing operation such as a washing process, a rinsing process, and a dehydration process.

The washing machine 1 may include a body 2, a tub 3 (fixed tub), a drum 4 (rotating tub), a drive unit 5 (e.g., a driver), and a controller 6 (e.g., a control device or at least one processor).

The controller 6 is comprised of hardware, such as a central processing unit (CPU) and a memory, and software, such as a control program and various data. The controller 6 may include at least one processor. The processor may be configured to execute program instructions maintained on memory.

The body 2 is a box-shaped container formed of a panel or a frame, and the body 2 may form an appearance of the washing machine 1. The front of the body 2 is provided with a circular inlet 2a for putting in or taking out the laundry. The inlet 2a is provided with a door 22 having a transparent window. The inlet 2a is opened and closed by the door 22. In the body 2, a manipulator 7 provided with a switch manipulated by a user may be installed in the upper side of the inlet 2a.

<Tub 3>

The tub 3 communicating with the inlet 2a is provided in the body 2. The tub 3 is provided with a cylindrical water storage container with a bottom, and an opening of the tub 3 is connected to the inlet 2a. The tub 3 is supported by a damper (not shown) provided in the body 2 so as to be stable in a position in which a center line J is slightly inclined upward.

Above the tub 3, a water supply apparatus 8 including a water supply pipe 8a, a water supply valve 8b and a detergent supply device 8c is provided. An upstream end of the water supply pipe 8a protrudes to the outside of the washing machine 1 and then connected to a water supply source (not shown). A downstream end of the water supply pipe 8a is connected to a water supply port 3a opened to the upper side of the tub 3. In the middle of the water supply pipe 8a, the water supply valve 8b and the detergent supply device 8c are sequentially provided from the upstream side.

The detergent supply device 8c stores detergent, and mixes the stored detergent with the supplied water, thereby supplying the mixed water to the tub 3. A discharge port 3b is provided in a lower portion of the tub 3. The discharge port 3b is connected to a drain pump 9. The drain pump 9 discharges the unnecessary water stored in the tub 3 to the outside of the washing machine 1 through a drain pipe 9a.

<Drum 4>

The drum 4 is formed with a cylindrical container having a diameter slightly smaller than the tub 3. The drum 4 is placed in the tub 3 while being aligned with the center line J of the tub 3. In a front portion of the drum 4, a circular opening 4a corresponding to the inlet 2a is formed. The laundry is introduced into the drum 4 through the inlet 2a and the circular opening 4a.

In a side portion of the drum 4, many dehydration holes 4b are formed over the whole circumference (only one part is shown in FIG. 1). Further, a stirring lifter 4c is provided in a plurality of places inside the side portion. The front portion of the drum 4 is rotatably supported by the inlet 2a.

Figure 2:
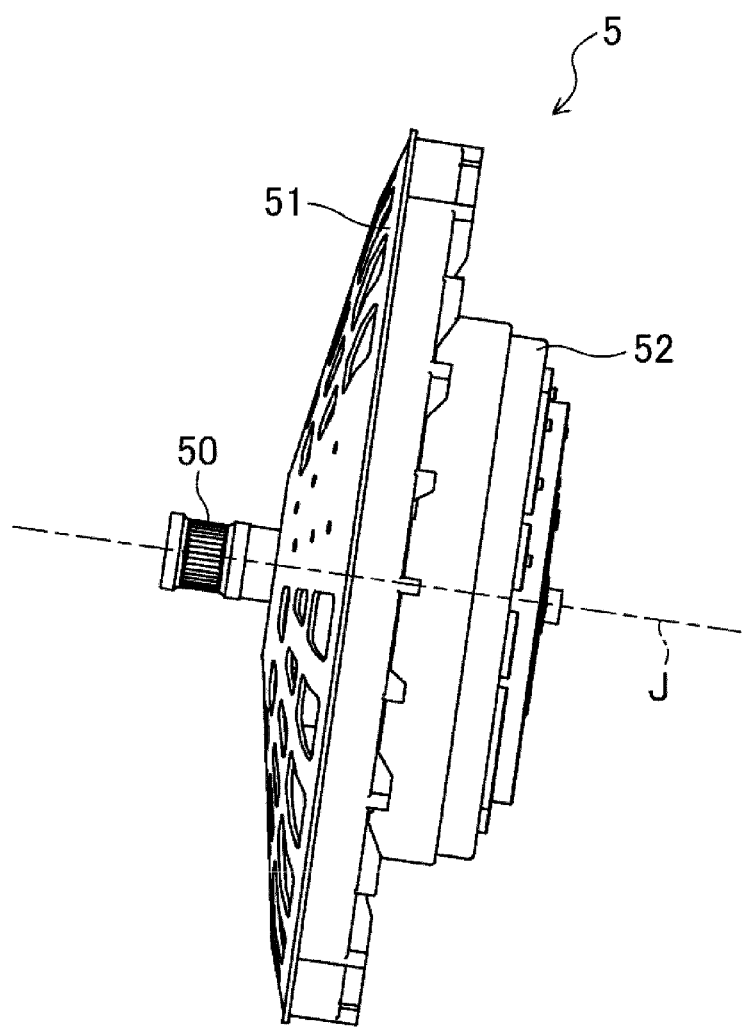
FIG. 2 is a schematic side view illustrating an appearance of a drive unit according to an embodiment of the disclosure.

FIG. 2 is a schematic side view illustrating an appearance of a drive unit according to an embodiment of the disclosure.

Figure 3:
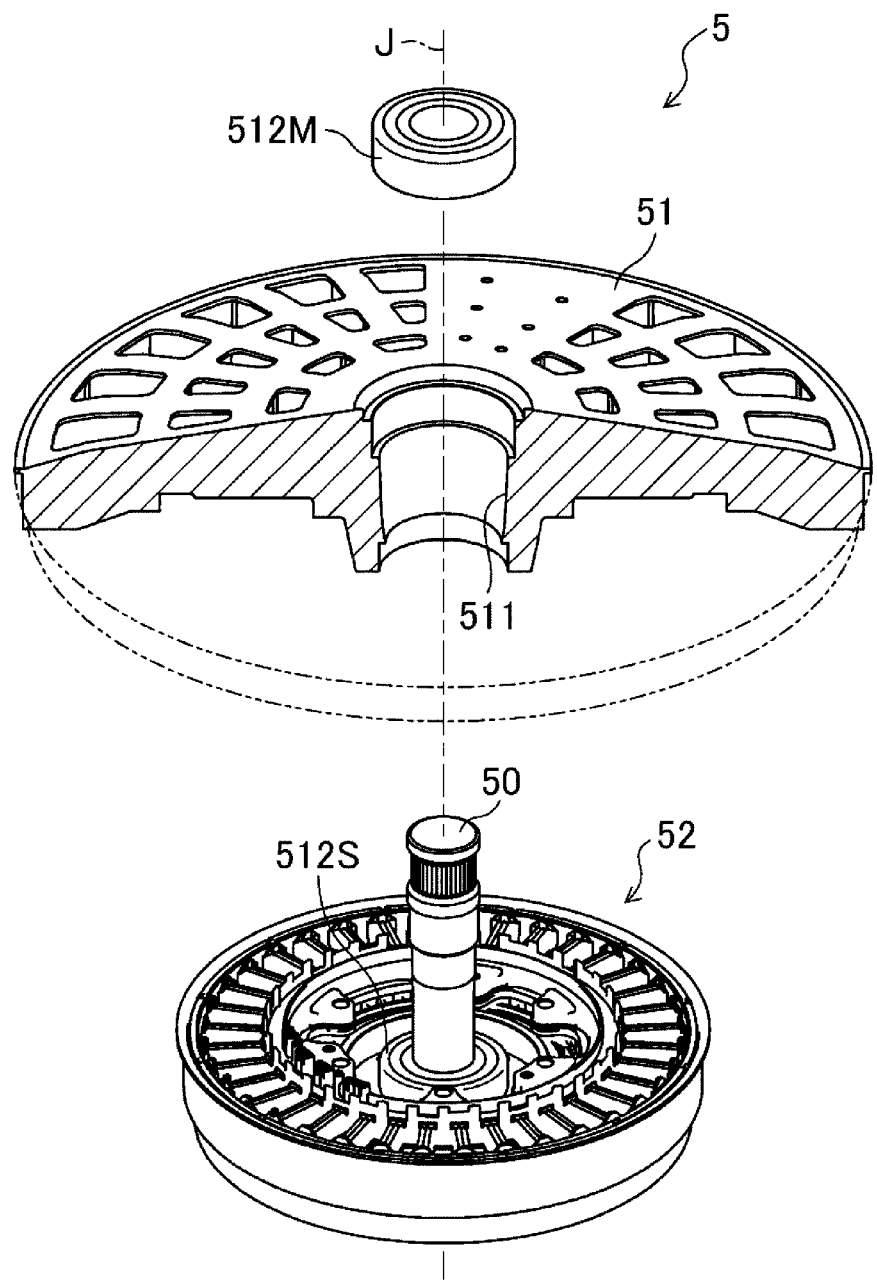
FIG. 3 is an exploded perspective view illustrating a main member of the drive unit according to an embodiment of the disclosure.

At the bottom of the tub 3, the drive unit 5 is installed. Referring to FIGS. 2 and 3, the drive unit 5 includes a shaft 50, a unit base 51, and a motor 52. The shaft 50 penetrates the bottom of the tub 3 and protrudes into the tub 3. An end of the shaft 50 is fixed to the center of the bottom of the drum 4.

That is, the bottom portion of the drum 4 is axially supported by the shaft 50, and thus the drive unit 5 drives the drum 4 directly (corresponding to the so-called direct drive method). Therefore, the drum 4 is rotated around the center line J by the drive of the motor 52.

The center line J corresponds to a rotation axis. Because the washing machine 1 is a drum type, the rotation axis J is arranged to extend in a direction inclined to the horizontal direction or in a substantially horizontal direction.

The controller 6 is provided in the upper portion of the body 2. The controller 6 includes hardware, such as a CPU and a memory, and software, such as a control program and various data. The controller 6 comprehensively controls the operation of the washing machine 1.

An inverter 10 configured to receive electric power from an external power source is installed in the body 2. The inverter 10 is electrically connected to the controller 6 and the drive unit 5. The drive unit 5 is driven because the controller 6 controls the inverter 10. Accordingly, the drum 4 is rotated.

<Drive Unit 5>

As mentioned above, the drive unit 5 includes the shaft 50, the unit base 51, and the motor 52.

Figure 4:
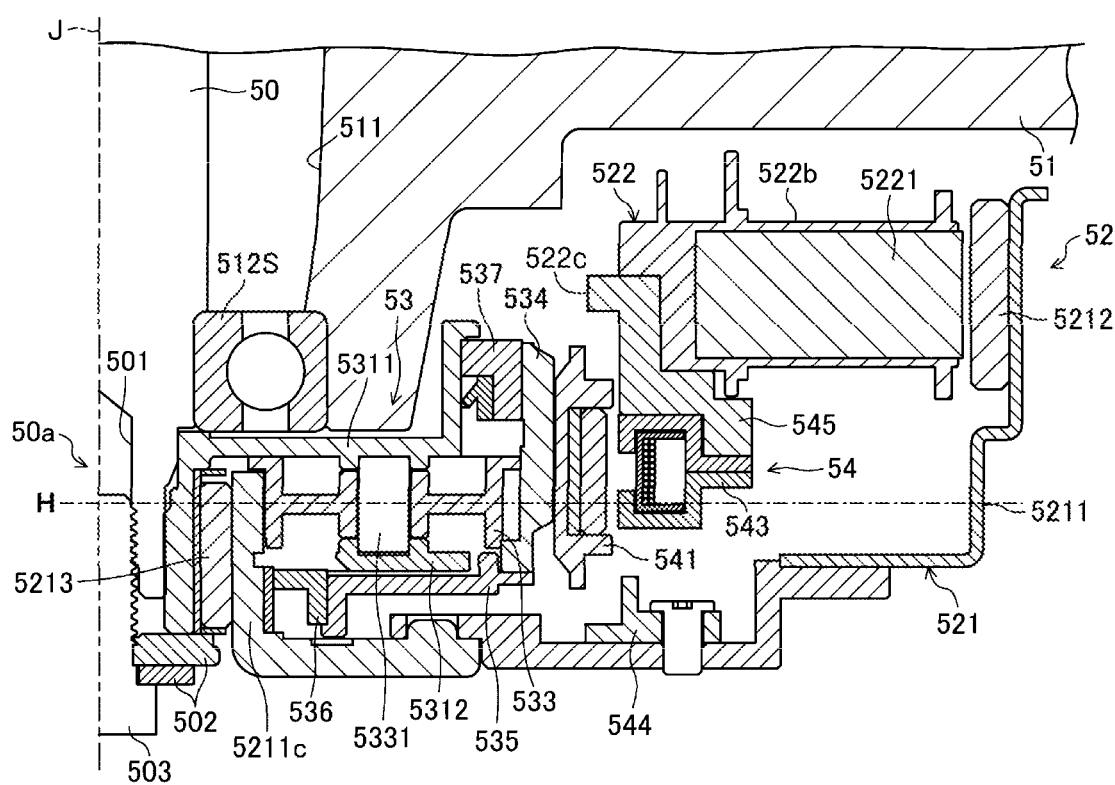
FIG. 4 is a schematic cross-sectional view of a main portion of the drive unit according to an embodiment of the disclosure.

FIG. 4 is a schematic cross-sectional view of a main portion of the drive unit 5 according to an embodiment of the disclosure.

FIG. 3 is an exploded perspective view illustrating a main member of the drive unit according to an embodiment of the disclosure.

Referring to FIG. 3, the unit base 51 is formed of a substantially disk-shaped metal or resin member provided at the bottom of the tub 3. A cylindrical shaft insertion hole 511 extending along the center line J is formed at the center of the unit base 51. A pair of ball bearings (main bearing 512M and sub bearing 512S) is mounted to both ends of the shaft insertion hole 511. In FIG. 3, the shaft 50 and the sub bearing 512S are shown assembled to the motor 52. The motor 52 is mounted to the rear of the unit base 51.

The shaft 50 is formed of a cylindrical metal member having a diameter smaller than that of the shaft insertion hole 511. The shaft 50 is inserted into the shaft insertion hole 511 while an end of the shaft 50 protrudes from the shaft insertion hole 511. The shaft 50 is supported by the unit base 51 through the pair of ball bearings 512M and 512S. As a result, the shaft 50 is rotatable about the rotation axis J.

A structure of the motor 521 is studied to be suitable for driving the washing machine. That is, in the washing machine 1, each process of washing, rinsing, and dehydration is performed. For this, the motor 52 is needed to have a high torque output at a low speed rotation and a low torque output at a high-speed rotation.

In general, a method of rotating the drum indirectly (indirect drive method) by interposing a reducer and a clutch between the drum and the motor, or a method of directly rotating the drum by driving the motor through the inverter control (direct drive method) is applied.

The drive unit 5 is configured to ease difficulties in the indirect drive method and the direct drive method by efficiently combining the indirect drive method with the direct drive method. That is, the washing machine 1 is configured to realize a large washing capacity, low noise and energy saving feature while having the compact size.

Particularly, the reducer 53 and the clutch 54, which are interposed between the shaft 50 and the motor 52, are efficiently combined and then integrated with the motor 52 configured to rotate the shaft 50 having a single output shaft. Therefore, the motor 52, the reducer 53, and the clutch 54 are in the state lined up in a direction H (refer to FIG. 4) substantially perpendicular to the rotation axis J. This structure will be described in detail below.

<Base End 50a of Shaft 50>

Referring to FIG. 4, the base end 50a of the shaft 50 protrudes from the sub bearing 512S. A screw hole 501 extending along the center line J is formed at the base end 50a of the shaft 50. A serration extending along the centerline J is formed in the outer circumferential surface of the base end 50a of the shaft 50 (refer to FIG. 7). A bolt 503 is fastened to the screw hole 501 via a retainer 502. Therefore, a main frame 5311 of a carrier 531 described later is fixed to the base end 50a of the shaft 50.

<Motor 52>

The motor 52 includes a rotor 521 and a stator 522. The motor 52 is a so-called outer rotor type in which the rotor 521 is located on the outside of the stator 522.

Figure 5:
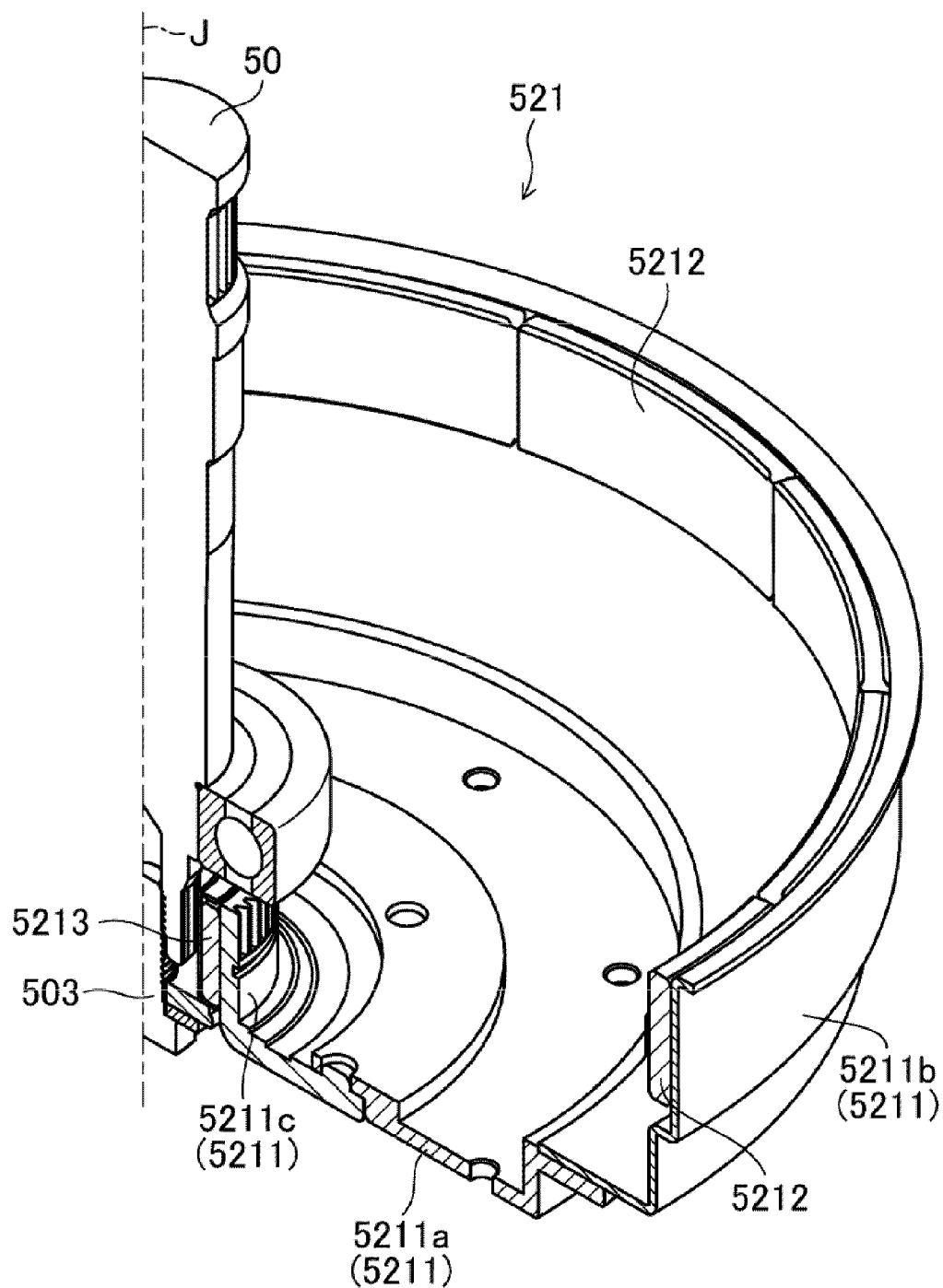
FIG. 5 is a schematic perspective view illustrating a part of a shaft and a rotor according to an embodiment of the disclosure.

FIG. 5 is a schematic perspective view illustrating a part of a shaft and a rotor according to an embodiment of the disclosure.

Referring to FIG. 5, the rotor 521 includes a rotor case 5211, and a plurality of magnets 5212. The rotor case 5211 is formed of a member having a cylindrical shape having a bottom in which a center thereof is arranged to coincide with the rotation axis J. The rotor case 5211 includes a disk-shaped bottom wall 5211a in which a circular hole is opened at the center thereof, and a cylindrical circumferential wall 5211b continuously provided around the bottom wall 5211a. The bottom wall 5211a may be formed as a single piece or formed with a plurality of pieces. The rotor case 5211 is formed such that a bottom thereof is thin (small thickness) and a height of the circumferential wall 5211b is less than a radius of the bottom wall 5211a.

A cylindrical shaft support 5211c facing the circumferential wall 5211b is formed around a circular hole opened at the center of the bottom wall 5211a. A gear is formed in an outer circumferential surface of the shaft support 5211c, and the shaft support 5211c also serves as a sun gear described later (sun gear 5211c).

A cylindrical oil impregnated bearing 5213 is fixed to the inside of the shaft support 5211c. The shaft support 5211c is slidably supported by the shaft 50 (particularly, a main frame 5311 fixed to the shaft 50) through the oil impregnated bearing 5213. Therefore, the rotor case 5211 is rotatable with respect to the shaft 50. The oil impregnated bearing 5213 constitutes a rotor bearing portion.

Each magnet 5212 is formed with a rectangular permanent magnet curved in an arc shape. Each magnet 5212 is arranged in series in the circumferential direction and then fixed to the inner surface of the circumferential wall 5211b of the rotor case 5211. Each magnet 5212 constitutes a magnetic pole of the rotor 521 and thus the S pole and the N pole are alternately arranged side by side.

Figure 6:
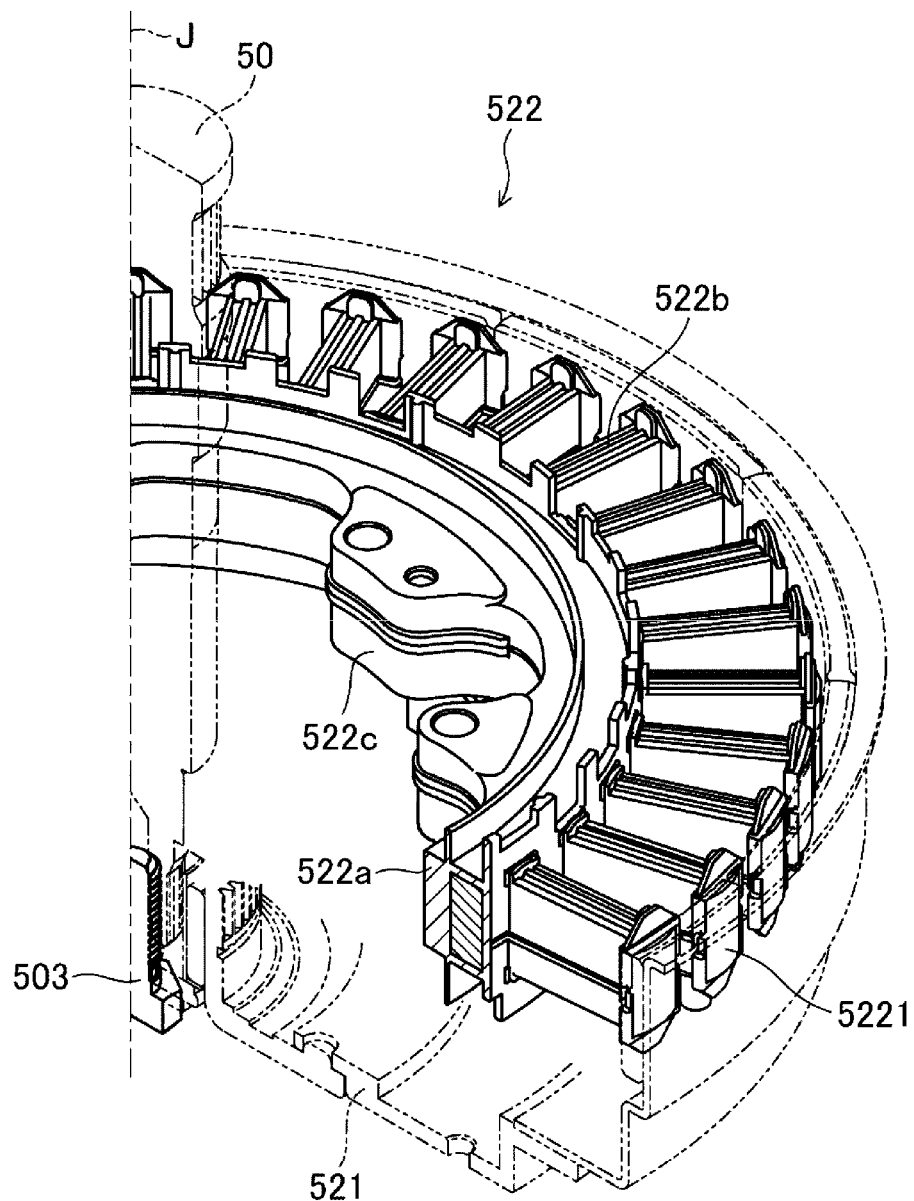
FIG. 6 is a schematic perspective view illustrating a part of a stator according to an embodiment of the disclosure.

FIG. 6 is a schematic perspective view illustrating a part of a stator according to an embodiment of the disclosure.

Referring to FIG. 6, the stator 522 is formed of a circular annular (annular) member. The stator 522 includes a circular annular core 522a, a plurality of tooth portions 522b protruding radially outwards from the core 522a. The stator 522 is fixed to the unit base 51 through a fixed flange 522c provided in the core 522a. The stator 522 is accommodated in the rotor case 5211.

The core 522a and each tooth portion 522b are formed by covering a surface of a magnetic stator core 5221 with an insulating insulator. Although not shown, a plurality of coils is formed in each tooth portion 522b by winding wires in a predetermined order. A part of the stator core 5221 is exposed at an end surface of each tooth portion 522b located at the outer circumferential portion of the stator 522. The exposed portions of the stator core 5221 face the magnet 5212 of the rotor 521 in the diameter direction at a predetermined gap.

The plurality of coils constitutes a three-phase coil group composed of U, V, and W. Each of the coil groups supplies alternating current (AC) as the controller 6 controls the inverter 10. Accordingly, a magnetic field is formed between each coil group and the magnet of the rotor 521. By the action of the magnetic force, the rotor 521 is rotated about the rotation axis J.

<Reducer 53>

The reducer 53 is arranged around the shaft support 5211c. The reducer 53 is accommodated in the rotor case 5211.

Figure 7:
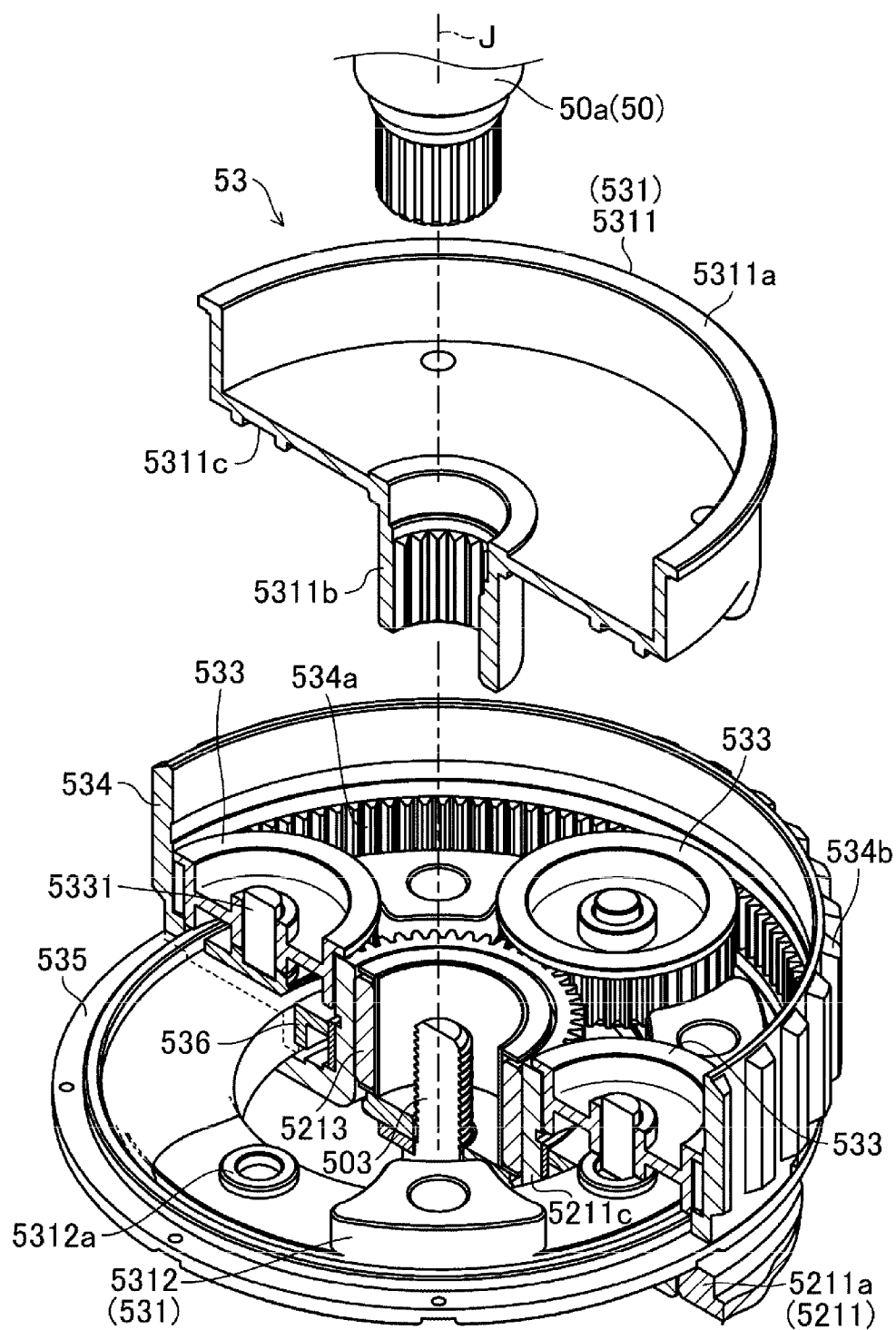
FIG. 7 is a schematic perspective view illustrating a part of a reducer according to an embodiment of the disclosure.

FIG. 7 is a schematic perspective view illustrating a part of a reducer according to an embodiment of the disclosure.

Referring to FIG. 7, it illustrates a portion of the reducer 53. The reducer 53 is a reducer using a so-called planetary gear mechanism. The reducer 53 includes a carrier 531, a sun gear 5211c, a plurality of planetary gears 533 (four gears in the drawings), and an internal gear 534.

The carrier 531 includes a main frame 5311 and a sub-frame 5312. The sub-frame 5312 is formed of an annular member having four lower bearing grooves 5312a. The sub-frame 5312 is mounted on the rotor case 5211 through an annular guide plate 535.

A ring-shaped sliding member 536 is fixed to the inside of the guide plate 535. The guide plate 535 is rotatably mounted on the bottom wall 5211a of the rotor case 5211 while the sliding member 536 is interposed between the guide plate 535 and the shaft support 5211c.

The main frame 5311 includes a cylindrical base 5311a having a shallow bottom, and a cylindrical shaft support 5311b protruding rearward from the center portion of the base 5311a. A rear surface of the base 5311a is disposed to face the sub-frame 5312. A plurality of upper bearing grooves 5311c is formed on the rear surface of the base 5311a to face the lower bearing grooves 5312a, respectively.

A serration fitted to the base end 50a of the shaft 50 is formed on an inner circumferential surface of the shaft support 5311b. As the base end 50a of the shaft 50 is inserted into the shaft support 5311b, the main frame 5311 is fixed to the shaft 50 and thus the main frame 5311 is not rotatable. As described above, the shaft support 5211c of the rotor 521 is supported around the shaft support 5311b through the oil impregnated bearing 5213 constituting the rotor bearing portion. The shaft support 5211c constitutes the sun gear rotated about the rotation axis J.

The internal gear 534 is formed of a substantially cylindrical member having a diameter greater than that of the sun gear 5211c. A gear 534a is provided in a lower portion of an inner circumferential surface of the internal gear 534. In the gear 534a, the teeth of the gear are formed along the entire circumference. In addition, on an outer circumferential surface of the internal gear 534, a plurality of inner slide guides 534b, which is formed with linear protrusions extending in the rotation axis direction, is formed along the entire circumference at a predetermined distance. This inner slide guide 534b will be described later.

The internal gear 534 is disposed about the rotation axis J around the sun gear 5211c. The lower portion of the internal gear 534 is disposed on the guide plate 535. A ring-shaped sliding member 537 is fixed to the inside of the upper portion of the internal gear 534 (refer to FIG. 4). The carrier 531 (main frame 5311) is rotatably supported by the internal gear 534 through the sliding member 537.

Each of the planetary gears 533 is rotatably supported by the carrier 531. The planetary gears 533 are arranged between the sun gear 5211c and the internal gear 534 so as to be engaged with the sun gear 5211c and the internal gear 534.

The planetary gear 533 is formed of a gear member having a small diameter. A pinhole is formed through the center of each planetary gear 533. Both ends of a pin 5331 inserted into the pin hole are axially supported by the upper bearing groove 5311c of the main frame 5311 and the lower bearing groove 5312a of the sub-frame 5312. On the outer circumferential surface of each planetary gear 533, the teeth of the gear are formed along the entire circumference. The teeth of the gear are engaged with both the sun gear 5211c and the internal gear 534.

Therefore, when the sun gear 5211c is rotated at a predetermined speed in the state in which the internal gear 534 is fixed (non-rotation state), each planetary gear 533 orbit around the sun gear 5211c in accordance with the rotation of the sun gear 5211c. Accordingly, the carrier 531 and the shaft 50 are rotated in a decelerated state.

<Clutch 54>

Figure 8:
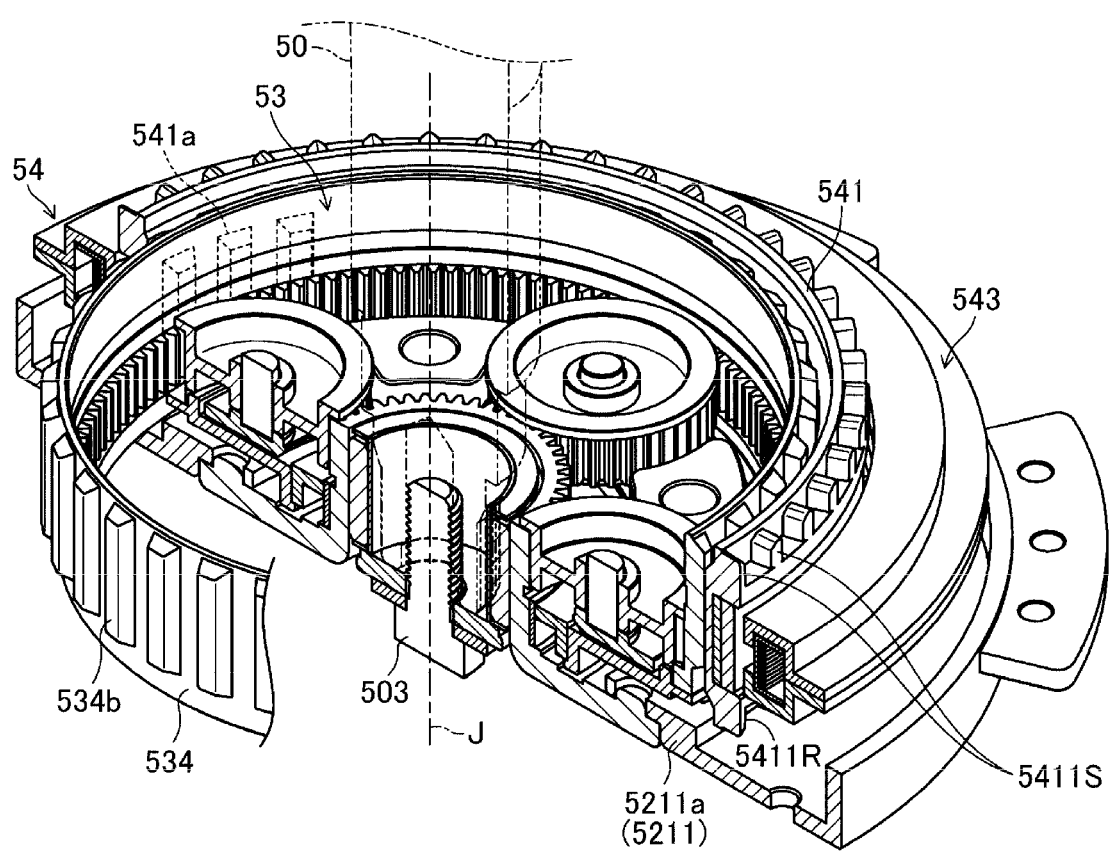
FIG. 8 is a schematic perspective view illustrating a part of the reducer and a part of a clutch according to an embodiment of the disclosure.
Figure 9:
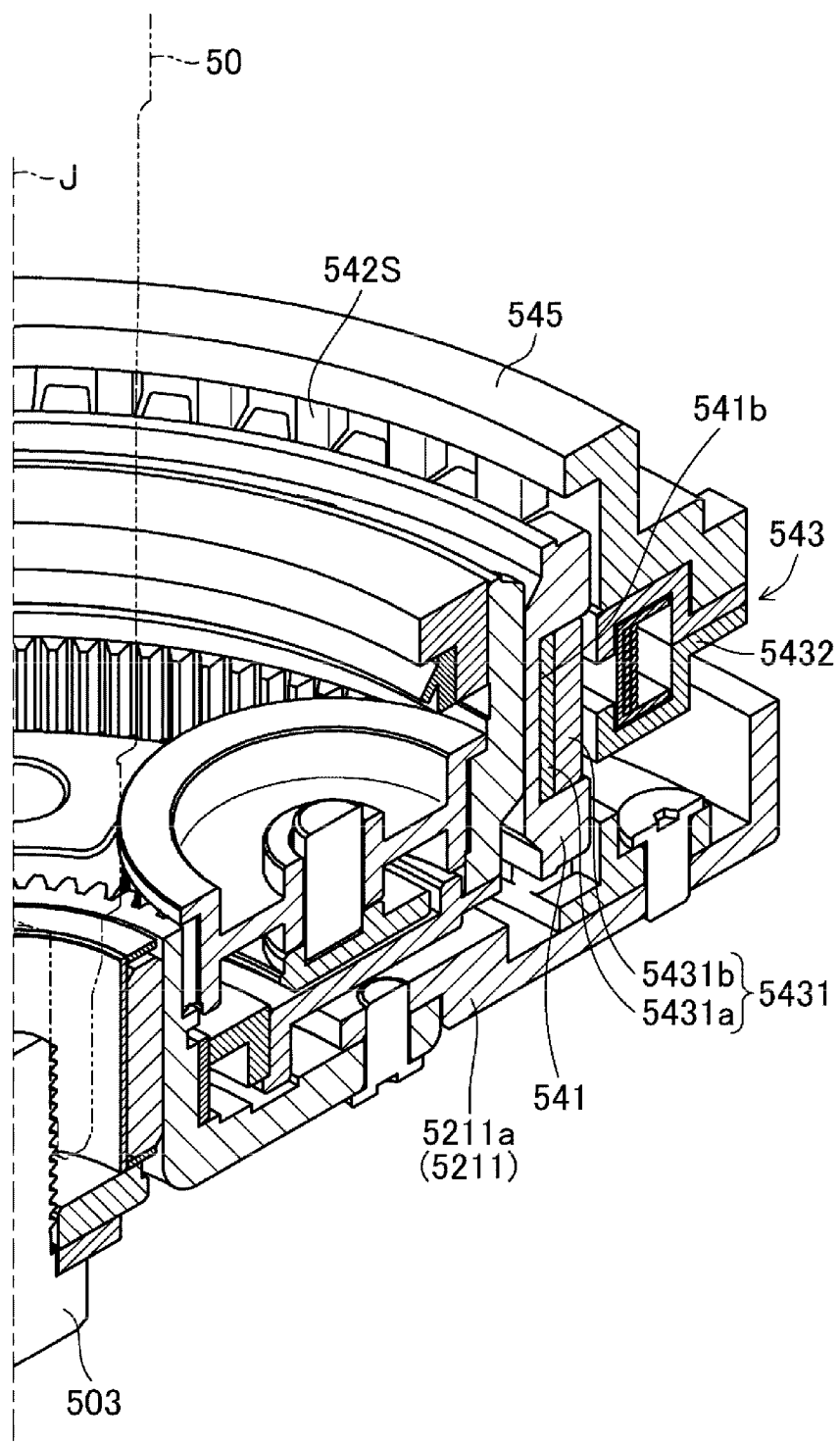
FIG. 9 is a schematic perspective view illustrating a main portion of the reducer and the clutch according to an embodiment of the disclosure.
Figure 10:
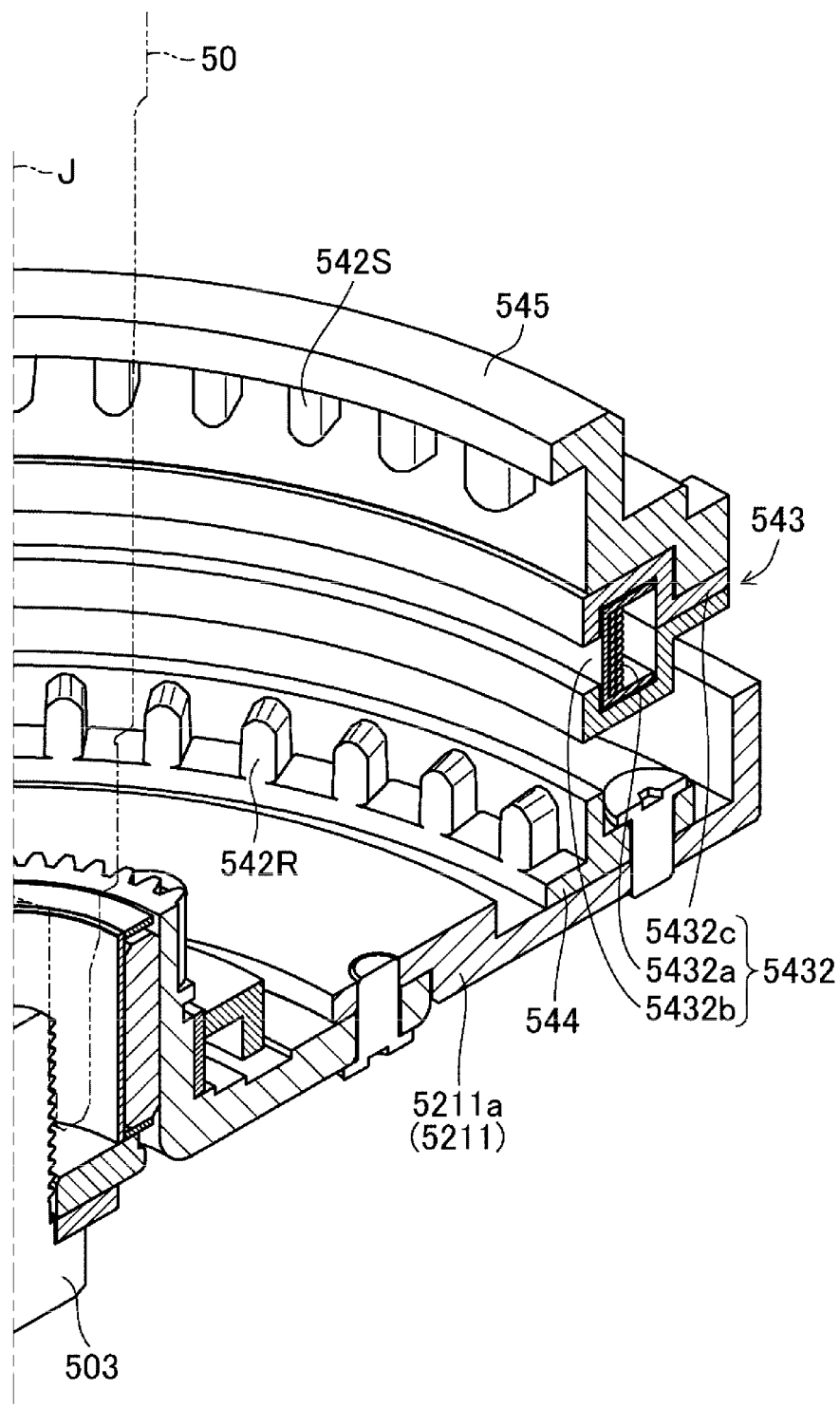
FIG. 10 is a schematic perspective view illustrating a main portion of the reducer and the clutch according to an embodiment of the disclosure.

The clutch 54 is arranged around the reducer 53. The clutch 54 is accommodated in the rotor case 5211. FIGS. 8 to 10 illustrate a portion of the reducer 53 and the clutch 54. The clutch 54 includes a slider 541 (movable portion), locking protrusions 542R and 542S (fixed portion) on the rotor side and the stator side, and a clutch driver 543 (actuator). The clutch driver 543 includes a movable element 5431 and a fixed element 5432.

FIG. 8 is a schematic perspective view illustrating a part of the reducer and a part of a clutch according to an embodiment of the disclosure.

The slider 541 is formed of a cylindrical member having a larger diameter than the internal gear 534. On the inner circumferential surface of the slider 541, outer slide guides 541a including linear protrusions extending in the rotation axis direction are formed along the entire circumference at a predetermined distance, referring to FIG. 8. The outer slide guide 541a is configured to be engaged with the plurality of inner slide guides 534b formed on the outer circumferential surface of the internal gear 534.

The slider 541 is disposed around the internal gear 534 in such a way that the outer slide guide 541a is engaged with the inner slide guide 534b of the internal gear 534. As a result, the slider 541 is slidable in the rotation axis direction.

On the outer circumferential surface of the slider 541, a pair of hooking protrusions 5411R and 5411S provided with hooking protrusions on the rotor side and the stator side is formed. The hooking protrusions 5411R and 5411S are provided with a plurality of protrusions (movable side protrusions) protruding in the rotation axis direction, and arranged along the entire circumference at a predetermined distance on the outer circumferential surface of the slider 541. The hooking protrusion 5411R on the rotor side is disposed at the lower end of the slider 541, and each protrusion protrudes downward. The hooking protrusion 54115 on the stator side is disposed at the upper end of the slider 541, and each protrusion protrudes upward.

On the outer circumferential surface of the slider 541, a movable element accommodating portion 541b configured to accommodate the movable element 5431 is formed between the hooking protrusions 5411R and 5411S on the rotor side and the stator side.

FIG. 10 is a schematic perspective view illustrating a main portion of the reducer and the clutch according to an embodiment of the disclosure.

Referring to FIG. 10, the locking protrusion 542R (first fixed portion) on the rotor side is provided in an annular member 544 mounted to the rotor case 5211. The locking protrusion 542R on the rotor side is provided with a plurality of protrusions (fixed side protrusion) protruding in the rotation axis direction at a predetermined distance along the entire circumference. The protrusions protrude upwards. Alternatively, although not shown, when the protrusion is integrally formed with the rotor, the protrusion may be integrally formed with another element or integrally formed with the rotor case 5211.

The locking protrusion 542S (second fixed portion) on the stator side is provided in an annular member 545 mounted to the stator 522. The locking protrusion 542S on the stator side is provided with a plurality of protrusions (fixed side protrusion) protruding in the rotation axis direction at a predetermined distance along the entire circumference. The protrusion protrudes downward. In addition, the protrusion may be formed integrally with the insulator.

The locking protrusion 542R on the rotor side and the locking protrusion 542S on the stator side are disposed to face each other at a position separated in the rotation axis direction. The locking protrusion 542R on the rotor side is engaged with the hooking protrusion 5411R on the rotor side, and at the same time, the locking protrusion 542S on the stator side is engaged with the hooking protrusion 5411S on the stator side.

The distance between the locking protrusion 542R on the rotor side and the locking protrusion 542S on the stator side is set to be greater than the distance between the hooking protrusion 5411R on the rotor side and the hooking protrusion 5411S on the stator side. Therefore, when the locking protrusion 542R on the rotor side is engaged with the hooking protrusion 5411R on the rotor side, the locking protrusion 542S on the stator side is not engaged with the hooking protrusion 5411S on the stator side. When the locking protrusion 542S on the stator side is engaged with the hooking protrusion 5411S on the stator side, the locking protrusion 542R on the rotor side is not engaged with the hooking protrusion 5411R on the rotor side.

FIG. 9 is a schematic perspective view illustrating a main portion of the reducer and the clutch according to an embodiment of the disclosure.

Referring to FIG. 9, the movable element 5431 of the clutch driver 543 includes a slider core 5431a and a clutch magnet 5431b. The movable element 5431 is installed in the movable element accommodating portion 541b.

The slider core 5431a is formed with a metal cylindrical member having magnetic property. The slider core 5431a is installed in the inside of the movable element accommodating portion 541b. The clutch magnet 5431b is composed of a permanent magnet. The clutch magnet 5431b is arranged along the entire circumference of the movable element accommodating portion 541b while the clutch magnet 5431b is in contact with a surface of the slider core 5431a.

As illustrated in FIG. 10, the fixed element 5432 of the clutch driver 543 includes a clutch coil 5432a, a coil holder 5432b, and a holder support 5432c. The coil holder 5432b is formed with an insulating ring-shaped member having an approximately C-shaped cross section in which an opening is directed outward in the diameter direction. As a wire is wound around the coil holder 5432b, the clutch coil 5432a is formed.

The holder support 5432c is provided with a pair of upper and lower annular members sandwiching the coil holder 5432b therebetween. The holder support 5432c is fixed to the stator 522. Accordingly, the clutch coil 5432a (fixed element 5432) is arranged to face the clutch magnet 5431b (movable element 5431) with a slight gap in the diameter direction.

The current flow to the clutch coil 5432a is controlled by the controller 6. A magnetic field is formed between the clutch coil 5432a and the clutch magnet 5431b by supplying the current to the clutch coil 5432a. Accordingly, the slider 541 is slid to either side of the rotation axis direction.

Figure 11:
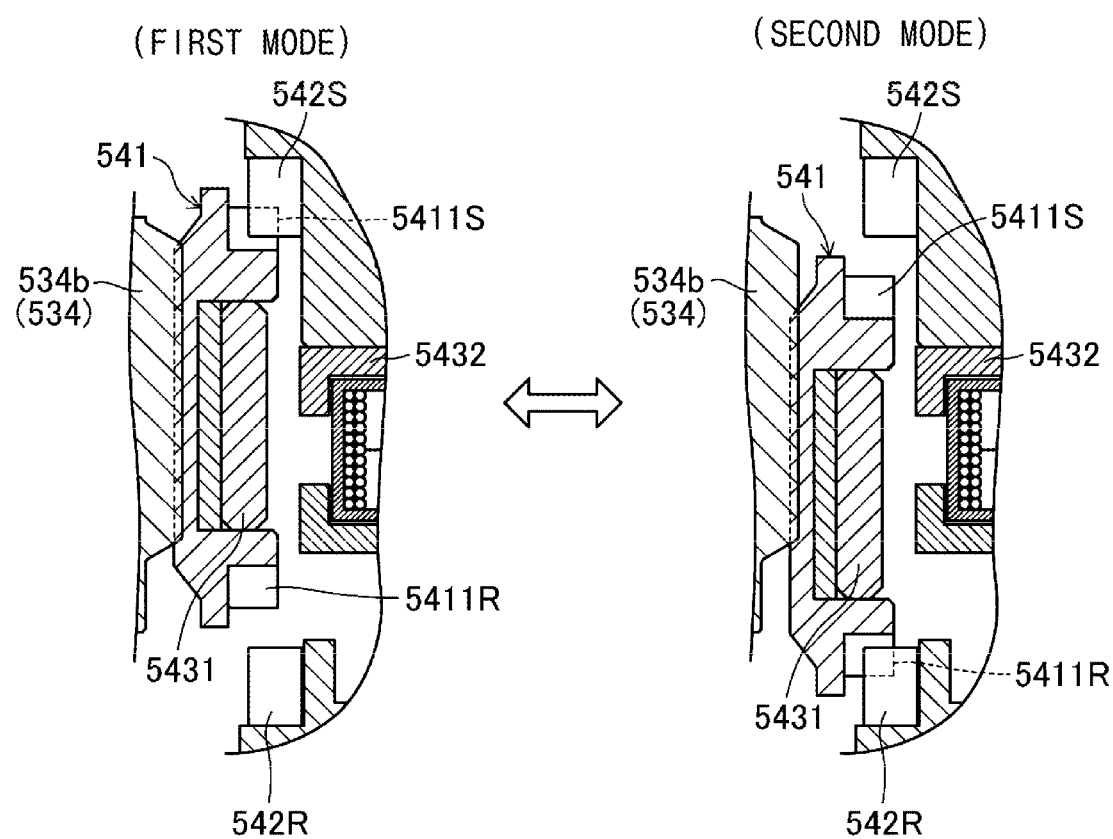
FIG. 11 is a view illustrating the switching of the clutch according to an embodiment of the disclosure.

FIG. 11 is a view illustrating the switching of the clutch according to an embodiment of the disclosure.

Referring to FIG. 11, the clutch is switched into a first mode in which the hooking protrusion 5411S on the stator side is engaged with the locking protrusion 542S on the stator side or a second mode in which the hooking protrusion 5411R on the rotor side is engaged with the locking protrusion 542R on the rotor side.

In the first mode, the internal gear 534 is supported by the stator 522 through the slider 541. Accordingly, the rotation of the rotor 521 and the sun gear 5211c is transmitted to the shaft 50 and the carrier 531 through the reducer 53. Therefore, the drive unit 5 outputs a high torque rotational force at low rotation.

Meanwhile, in the second mode, the internal gear 534 is supported by the rotor 521 through the slider 541. Accordingly, the rotation of the rotor 521 and the sun gear 5211c is transmitted to the shaft 50 and the carrier 531 without passing through the reducer 53.

That is, because the rotor 521, the sun gear 5211c, and the internal gear 534 are rotated integrally, each planetary gear 533 does not orbit. Accordingly, the shaft 50 and the carrier 531 are also rotated in accordance with the rotation of the rotor 521, the sun gear 5211c, and the internal gear 534. Therefore, the drive unit 5 outputs a low torque rotational force at high rotation.

As described above, as for the drive unit 5, the reducer 53 and the clutch 54 are efficiently integrated with the motor 52 and thus the reducer 53 and the clutch 54 are integrally formed with the motor 52. Therefore, the motor 52, the reducer 53, and the clutch 53 are aligned in a line substantially perpendicular to the rotation axis J. Therefore, by switching the clutch 54, it is possible to output a high torque rotational force at low rotation and a low torque rotational force at high rotation via a single shaft 50. Further, because the rotation speed and the torque value of the motor 52 may be set to relatively close values in the two modes of the first mode and the second mode having different outputs, it is possible to optimize the motor efficiency.

Therefore, the drive unit 5 may output a rotational force suitable for the washing machine in a compact size. The drive unit 5 is suitable for a washing machine.

<Operation of Washing Machine 1>

Figure 12B:
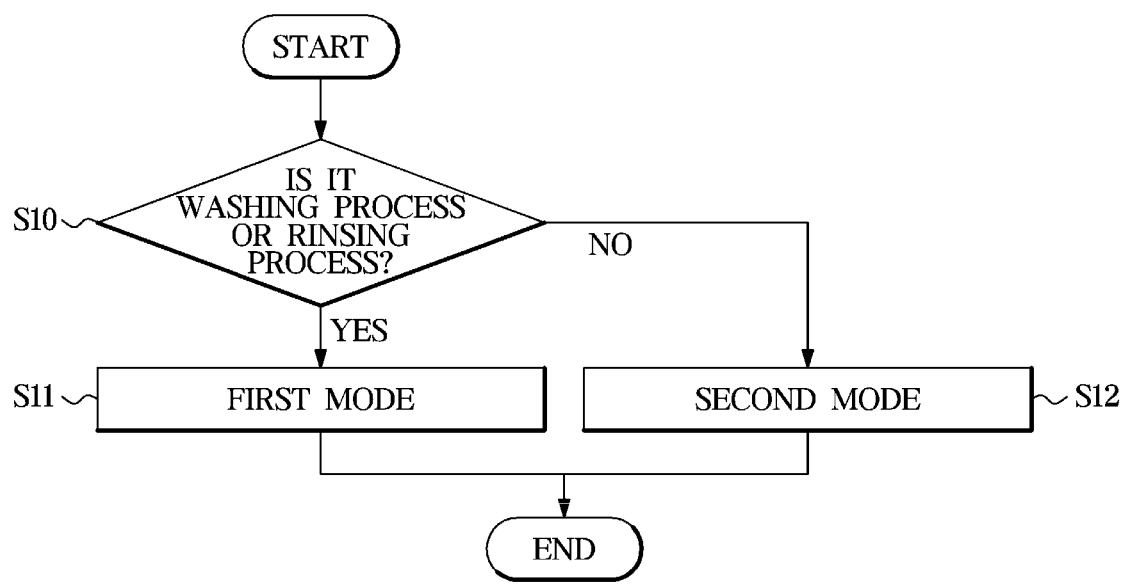
FIG. 12B is a flow chart illustrating an example of the switching of the clutch according to an embodiment of the disclosure.

FIG. 12A is a flow chart illustrating a basic operation of the washing machine according to an embodiment of the disclosure, and FIG. 12B is a flow chart illustrating an example of the switching of the clutch according to an embodiment of the disclosure.

FIGS. 12A and 12B illustrate an example of a basic operation of the washing machine 1.

When the operation of the washing machine 1 is performed, laundry is first put into the drum 4 (in operation S1). In the case of the washing machine 1, the detergent is put into the detergent supply device 8c at this time. A washing operation start command is input to the controller 6 by a manipulation of the manipulator 7 (yes in operation S2). Accordingly, the controller 6 automatically starts a series of washing operation including washing, rinsing, and dehydration.

Prior to the washing operation, the controller 6 measures the weight of the laundry to set the water supply amount (in operation S3). The controller 6 sets an appropriate amount of water supply based on the measured weight of the laundry (in operation S4).

When the setting of the water supply amount is completed, the controller 6 starts the washing operation (in operation S5). When the washing operation starts, the controller 6 controls the water supply valve 8b and supplies the tub 3 with a predetermined amount of water. At this time, the detergent contained in the detergent supply device 8c is introduced into the tub 3 together with the supplied water.

Subsequently, the controller 6 drives the drive unit 5 to start the rotation of the drum 4. At this time, prior to the rotation of the drum 4, the controller 6 identifies whether or not it is the washing process or the rinsing process (in operation S10). As a result of that, when it is the washing process or the rinsing process, the controller 6 controls the clutch 54 to switch the mode into the first mode (in operation S11). When it is the dehydration process not the washing process or the rinsing process, the controller 6 controls the clutch 54 to switch the mode into the second mode (in operation S12).

Because it is the washing process, the controller 6 switches the clutch 54 to the first mode. As a result, the high torque rotational force is output by the drive unit 5 at low speed. Thus, it is possible to efficiently rotate the relatively heavy drum 4 at a low speed.

When the washing process is completed, the controller 6 starts the rinsing process (in operation S6). In the rinsing process, the washing water collected in the tub 3 is drained by the driving of the drain pump 9. Subsequently, the controller 6 performs a water supply and stirring process similarly to the washing process.

In the rinsing process, the drive unit 5 is driven while the clutch 54 is maintained in the first mode.

When the rinsing process is completed, the controller 6 executes the dehydration process (in operation S7). In the dehydration process, the drum 4 is rotationally driven at a high speed for a predetermined time. Thus, the controller 6 switches the clutch 54 to the second mode before the dehydration process. In the second mode, it is possible to output a low torque rotational force at high rotation. Therefore, it is possible to efficiently rotate the relatively light drum 4 at a high speed.

The laundry is stuck to the inner surface of the drum 4 by centrifugal force. The water remaining in the laundry is discharged to the outside of the drum 4. The laundry is then dehydrated.

Water collected in the tub 3 by the dehydration is discharged by the driving of the drain pump 9. When the dehydration process is completed, the end of washing operation is notified, such as a predetermined buzzer is sounded, and the operation of the washing machine 1 is terminated.

<Details of Clutch 54>

Figure 13:
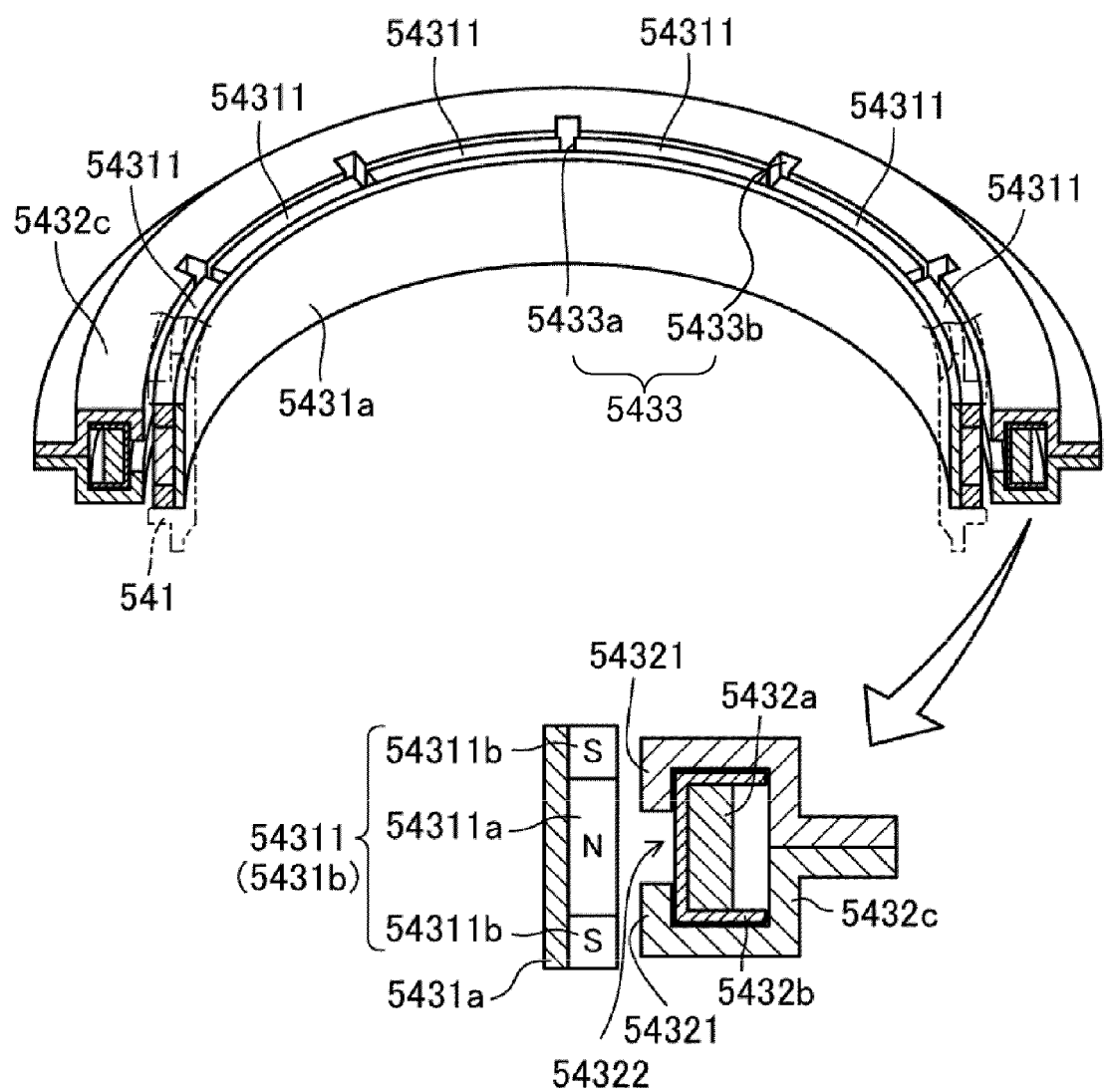
FIG. 13 is a schematic perspective view illustrating a main portion of the clutch according to an embodiment of the disclosure.

FIG. 13 is a schematic perspective view illustrating a main portion of the clutch according to an embodiment of the disclosure.

FIG. 13 illustrates the details of the clutch 54. Through the clutch 54, the reducer 54 may be stably switched using a simple structure. Because in the no-current flow state, a connection state of the slider 541 is maintained by the magnetic action by a permanent magnet, it is possible to reduce power consumption.

The clutch magnet 5431b includes a plurality of magnetic pole members 54311 in which the thin plate of the permanent magnet has an arc shape. Each magnetic pole member 54311 includes a plurality of magnetic poles (three in the drawing) in which the N pole and the S pole are alternately arranged in the rotation axis direction. Particularly, when the magnetic pole member 54311 is viewed in the cross-sectional direction, the magnetic pole member 54311 includes an intermediate magnetic pole 54311a located at its center and a pair of end magnetic poles 54311b located at both ends thereof.

A size of each end magnetic pole 54311b in the rotation axis direction is the same, and a size of the intermediate magnetic pole 54311a in the rotation axis direction is larger than the size of each end magnetic pole 54311b. In the drawing, the intermediate magnetic pole 54311a is the N pole, and the end magnetic pole 54311b is the S pole. Each magnetic pole 54311a and 54311b extends in the circumferential direction, and the cross-sectional structure of each magnetic pole member 54311 is the same. Further, the magnetic pole member 54311 may have a segment shape or a circular ring shape.

The holder support 5432c is formed of a metal having magnetic properties. In other words, the holder support 5432c constitutes a clutch yoke (hereinafter, the holder support 5432c is referred to as a clutch yoke 5432c). The clutch yoke 5432c includes a pair of magnetic pole facing portions 54321 and 54321 facing each end magnetic pole 54311b in the diameter direction with a small gap.

A pore 54322 is provided between the pair of magnetic pole facing portions 54321 and 54321 to face the intermediate magnetic pole 54311a in the diameter direction with a slight gap. Therefore, the intermediate magnetic pole 54311a faces the coil holder 5432b through the pore 54322.

When the clutch 54 is in the no-current flow state (when no current is supplied to the clutch coil 5432a), the movable element 5431 is changed in three different positions by magnetic action with the fixed element 5432 so as to have two stable points and one unstable point.

Figure 14A:
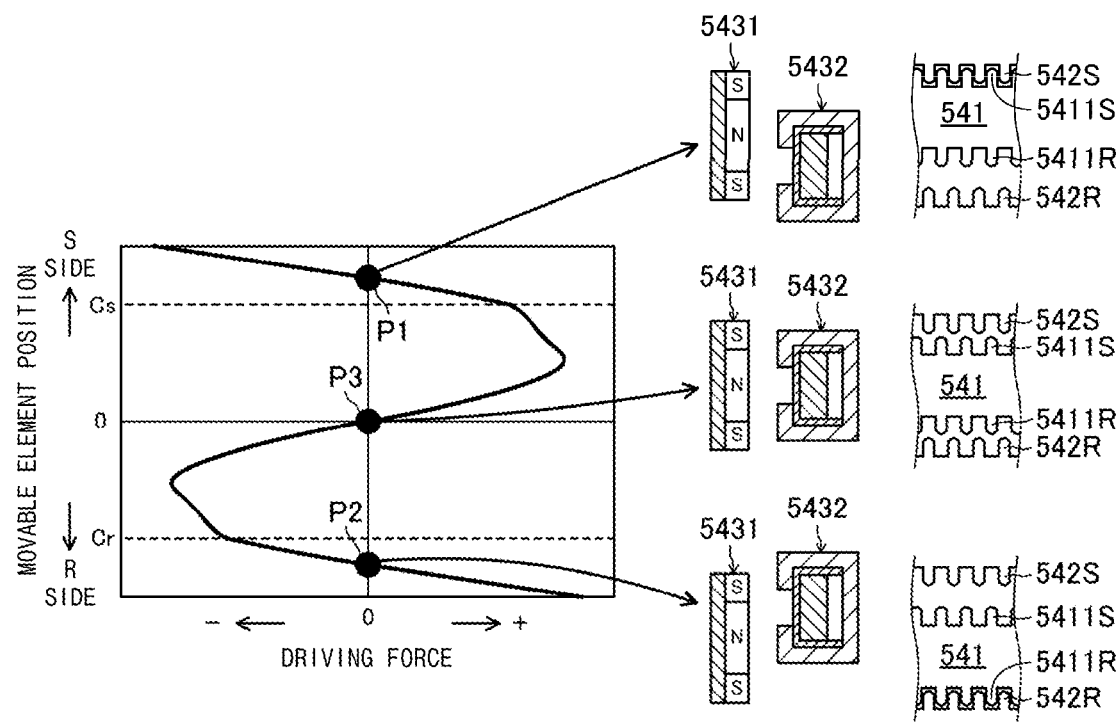
FIG. 14A is a view illustrating a function of the clutch (a no-current flow state) according to an embodiment of the disclosure.

FIG. 14A is a view illustrating a function of the clutch (a no-current flow state) according to an embodiment of the disclosure.

Specific positions of the stable and unstable points are illustrated in FIG. 14A. A curved line, which is illustrated in the table of FIG. 14A, shows a relationship between the position of the movable element 5431 in the rotation axis direction relative to the fixed element 5432 and a driving force (detent torque) generated in the movable element 5431 by magnetic action, that is a magnetic force operated when the clutch coil is not excited (current is not supplied). The former is the vertical axis and the latter is the horizontal axis.

A position "0" of the movable element 5431 represents a position (neutral position) where the movable element 5431 and the fixed element 5432 face each other without bias. In the neutral position, each end magnetic pole 54311b faces each magnetic pole facing portion 54321, and the intermediate magnetic pole 54311a faces the coil holder 5432b. In the neutral position, the driving force is "0". When the position is shifted slightly to the stator side or the rotor side from the neutral position, the driving force may be generated and increased in the shifted direction. Therefore, the movable element 5431 becomes magnetically unstable (unstable point P3).

When the movable element 5431 is in the neutral position, the slider 541 is positioned apart between the locking protrusion 542R on the rotor side and the locking protrusion 542S on the stator side. Therefore, the hooking protrusions 5411R and 5411S are not engaged with the locking protrusions 542R and 542S. Because the movable element 5431 is magnetically unstable, the slider 541 slides without staying. Further, the end portions of the locking protrusions 542R and 542S and the hooking protrusions 5411R and 5411S are formed in an inverted U-shape or inverted V-shape with sharp ends so as to be easily engaged (refer to FIGS. 8 and 10).

When the movable element 5431 slides on the stator side (S side), the driving force toward the stator side (plus direction) increases, and after the movable element 5431 reaches a peak at a predetermined position, the driving force decreases. Therefore, the driving force becomes "0" again and reaches a point at which the movable element 5431 becomes magnetically stable (first stable point P1).

At the first stable point P1, the end magnetic pole 54311b on the stator side is located on the outside of the clutch yoke 5432c, and the intermediate magnetic pole 54311a faces the magnetic pole facing portion 54321 on the stator side. The end magnetic pole 54311b on the rotor side faces the end magnetic pole 54311b on the rotor side and the pore 54322. As the movable element 5431 is directed to the first stable point P1, the locking protrusion 542S on the stator side is engaged with the hooking protrusion 5411S on the stator side.

Figure 14B:
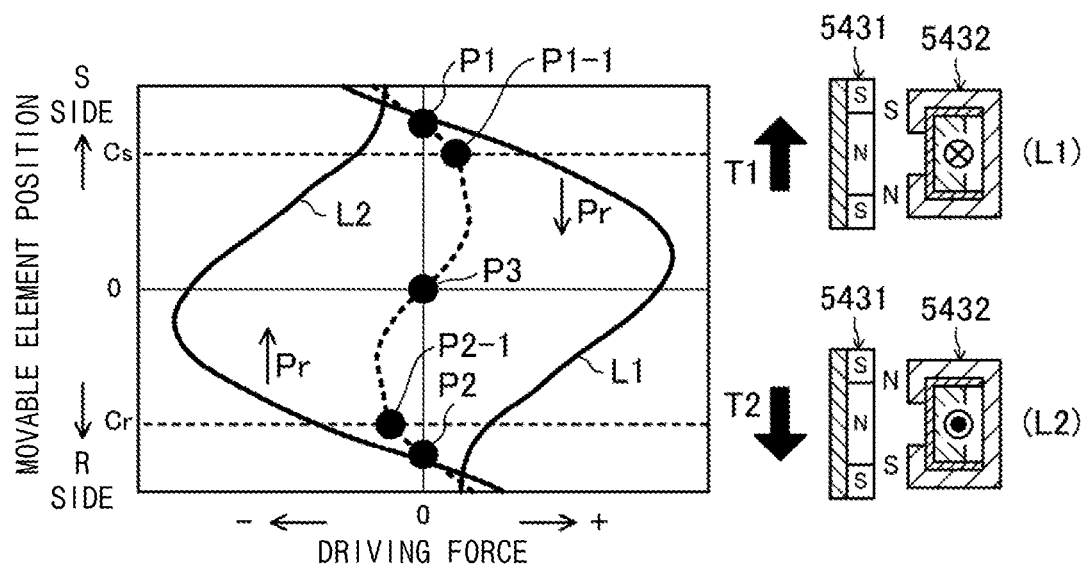
FIG. 14B is a view illustrating a function of the clutch (a current flow state) according to an embodiment of the disclosure.

In the embodiment, it is set that the locking protrusion 542S on the stator side and the hooking protrusion 5411S on the stator side are engaged with each other at a point P1-1 (connection position Cs) that is before reaching the first stable point P1 (refer to FIG. 14B). At an engagement point P1-1, the driving force toward the first stable point P1 is maintained, which are described later.

When the movable element 5431 slides on the rotor side (R side), the driving force toward the rotor side (minus direction) increases and the driving force decreases after reaching the peak at a predetermined position. Therefore, the driving force becomes "0" again and reaches the point at which the movable element 5431 becomes magnetically stable (second stable point P2).

At the second stable point P1, the end magnetic pole 54311b on the rotor side is located on the outside of the clutch yoke 5432c, and the intermediate magnetic pole 54311a faces the magnetic pole facing portion 54321 on the rotor side. The end magnetic pole 54311b on the stator side faces the end magnetic pole 54311b on the stator side and the pore 54322. As the movable element 5431 is directed to the second stable point P2, the locking protrusion 542R on the rotor side is engaged with the hooking protrusion 5411R on the rotor side.

In the embodiment, it is set that the locking protrusion 542R on the rotor side and the hooking protrusion 5411R on the rotor side are engaged with each other at a point P2-1 (connection position Cr) that is before reaching the second stable point P2 (refer to FIG. 14B). At an engagement point P2-1, the driving force toward the second stable point P2 is maintained.

The connection position Cs on the stator side where the locking protrusion 542S is engaged with and the hooking protrusion 5411S and the connection position Cr on the rotor side where the locking protrusion 542R is engaged with and the hooking protrusion 5411R are set as the engagement point P1-1 and the engagement point P2-1. Accordingly, by the detent torque, the engagement state of each connection position Cs and Cr may be stably maintained in the no-current flow state.

In addition, when the clutch 54 is in the no-current flow state, the movable element 5431 located in the neutral position is unstable. In other words, when the movable element 5431 is shifted from the neutral position to the rotation axis direction, the driving force is applied and the movable element 5431 slides easily.

When the clutch 54 is in the current flow state that is the current is supplied to the clutch coil 5432a, the slider 541 slides to one of the stator side and the rotor side in accordance with the current direction. The first mode for sliding to the stator side or the second mode for sliding to the rotor side is selected according to a direction in which the current flows.

FIG. 14B is a view illustrating a function of the clutch (a current flow state) according to an embodiment of the disclosure.

FIG. 14B illustrates a relationship between a position of the movable element 5431, which is in the rotation axis direction and relative to the fixed element 5432, and a driving force applied to the movable element 5431. A dotted line represents the detent torque. A solid line L1 represents the driving force in the first mode, and a solid line L2 represents the driving force in the second mode.

In the first mode, current flows through the clutch coil 5432a so that the magnetic pole facing portion 54321 on the rotor side becomes the N pole, and the magnetic pole facing portion 54321 on the stator side becomes the S pole. As a result, an electromagnetic force generated in the fixed element 5432 is applied to the clutch magnet 5431b, and a driving force T1 toward the stator side is generated in the movable element 5431. The driving force T1 is designed in such a size to sufficiently overcome the detent torque and to move the movable element 5431 to the stator side even the movable element 5431 is in the connection position on the rotor side. Therefore, the movable element 5431 at any position slides to the stator side.

In the second mode, current flows in the clutch coil 5432a so that the magnetic pole facing portion 54321 on the rotor side becomes the S pole, and the magnetic pole facing portion 54321 on the stator side becomes the N pole. As a result, an electromagnetic force generated by the fixed element 5432 is applied to the clutch magnet 5431b, and a driving force T2 toward the rotor side is generated on the movable element 5431. The driving force T2 is designed to be generated in the connection position of the stator side. Therefore, the movable element 5431 at any position slides to the rotor side.

<Positioning of the Clutch 54 in the Circumferential Direction>

The slider 541 is configured such that a position thereof is selected in the circumferential direction to allow the locking protrusion 542S to be smoothly engaged with the hooking protrusion 5411S.

In the middle of the switching of the clutch 54, the movable element 5431 is in a free state without engagement. Accordingly, the movable element 5431 is engaged with the fixed element 5432 while the end portion of the locking protrusions 542R and 542S is guided to the hooking protrusions 5411R and 5411S, which are formed in a shape that is easy to be engaged as described above.

However, it is appropriate that the movable element 5431 is more smoothly engaged than the fixed element 5432 for the reduction of the impact sound. Therefore, a position selector 5433 is provided between the movable element 5431 and the fixed element 5432. The position selector 5433 may position the slider 541 at a predetermined position (reference position) where the locking protrusion 542S and the hooking protrusion 5411 are smoothly engaged with each other.

Particularly, as illustrated in FIG. 13, a predetermined distance (gap between pols 5433a) is provided between two adjacent magnetic pole members 54311 and 54311. A slit 5433b is provided at a plurality of locations in the circumferential direction of the clutch yoke 5432c so as to face the gap between pols 5433a in the diameter direction. Each slit 5433b is formed to divide the magnetic pole facing portion 54321 in the circumferential direction.

At the reference position, the gap between pols 5433a and the slits 5433b constituting the position selector 5433 are set to face each other in the diameter direction. When the gap between pols 5433a and the slit 5433b face each other in the diameter direction, non-uniform magnetic action occurs between the movable element 5431 and the fixed element 5432 in the circumferential direction. By detecting this non-uniform magnetic action, it is possible to position the slider 541 at the reference position.

The controller 6 controls the rotation of the motor, thereby positioning the slider 541 at the reference position before switching the clutch 54 from the second mode to the first mode. Therefore, the clutch 54 may be switched smoothly.

<Switching Control of Clutch 54>

The switching control of the clutch 54 is performed by the controller 6. As schematically illustrated in FIG. 1, the controller 6 includes a motor controller 6a and a clutch controller 6b. The motor controller 6a controls the drive of the motor 52. The clutch controller 6b controls the drive of the clutch 54.

Figure 15A:
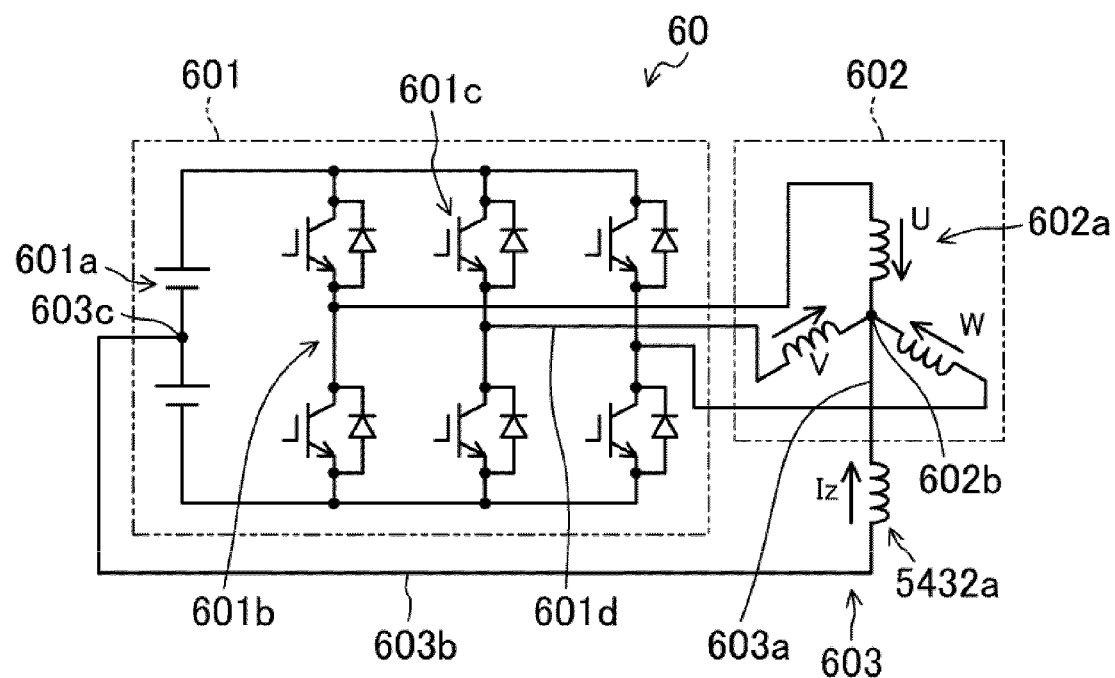
FIG. 15A is a schematic diagram illustrating a control circuit of the drive unit according to an embodiment of the disclosure.

The clutch controller 6b of the drive unit 5 shares a control circuit 60 with the motor controller 6a. FIG. 15A illustrates an example thereof FIG. 15A is a schematic diagram illustrating a control circuit of the drive unit according to an embodiment of the disclosure.

FIG. 15A illustrates the control circuit 60 (main portion) for driving the drive unit 5. The control circuit 60 includes an inverter drive circuit 601, a motor drive circuit 602, and a clutch drive circuit 603. The inverter drive circuit 601, the motor drive circuit 602, and the clutch drive circuit 603 are provided in the inverter 10.

As described above, the motor 52 includes three-phase coil groups 602a, 602a, and 602a composed of U, V, and W. Each of these coil groups 602a is star-connected (Y-connected) to form the motor drive circuit 602 having a neutral point 602b.

The inverter drive circuit 601 is electrically connected to an external commercial power source (not shown). The inverter drive circuit 601 includes a built-in converter (not shown). The converter converts the AC of the commercial power supply into a predetermined DC voltage and outputs the DC voltage. In FIG. 15A, the output DC voltage is schematically illustrated as a DC power source 601a.

The inverter drive circuit 601 converts the DC voltage into predetermined AC voltage of three different phases (U phase, V phase, and W phase) through pulse-width modulation (PWM) control. The inverter drive circuit 601 includes three arms 601b, 601b, and 601b which are arranged between a pair of bus bars. In each arm 601b, two element units 601c each composed of a switching element and a reflux diode connected in anti-parallel are arranged in series.

An output line 601d drawn out between two element units 601c and 601c of each arm 601b is connected to each coil group 602a. The element unit 601c of each arm 601b is turned on and off at a predetermined timing. Accordingly, the AC voltage having different phases is supplied to the coil group 602a, and thus the motor 52 is rotated in synchronization with the AC voltage.

The clutch drive circuit 603 includes a clutch coil 5432a, a motor side wiring 603a, and an inverter side wiring 603b. One end of the clutch coil 5432a is connected to the neutral point 602b through the motor side wiring 603a. The other end of the clutch coil 5432a is connected to an electric potential point (bisecting electric potential point 603c) which bisects the electric potential of the DC power supply 601a through the inverter side wiring 603b.

As described above, when the motor 52 is driven, the AC voltage having different phases is supplied to the coil group 602a of each phase. At this time, because the neutral point 602b becomes approximately the same potential difference as the bisecting electric potential point 603c, little current flows through the clutch coil 5432a.

Therefore, the clutch 54 is not switched when the motor 52 is driven. The connection state of the clutch 54 is maintained by the detent torque.

The motor 52 is not driven when the clutch 54 is switched. The clutch 54 is switched using the inverter drive circuit 601 and the motor drive circuit 602. That is, the clutch control part 6b controls the element unit 601c of each arm 601b. For example, as indicated by arrows in FIG. 15A, a current is supplied to the motor drive circuit 602. Accordingly, a predetermined zero phase current Iz may be supplied to the clutch coil 5432a.

When a predetermined zero phase current Iz is supplied to the clutch coil 5432a, the driving force is generated on the slider 541, and thus the clutch 54 is switched. By changing the control content of the element unit 601c, it is possible to allow the zero phase current Iz to flow in the reverse direction. Therefore, the clutch 54 may be switched. Because a semiconductor element is shared at the driving of the motor 52 and the clutch 54 by using the control circuit 60, it is possible to prevent the increase in the number of components and thus it is possible to prevent the increase in the manufacturing cost.

Figure 15B:
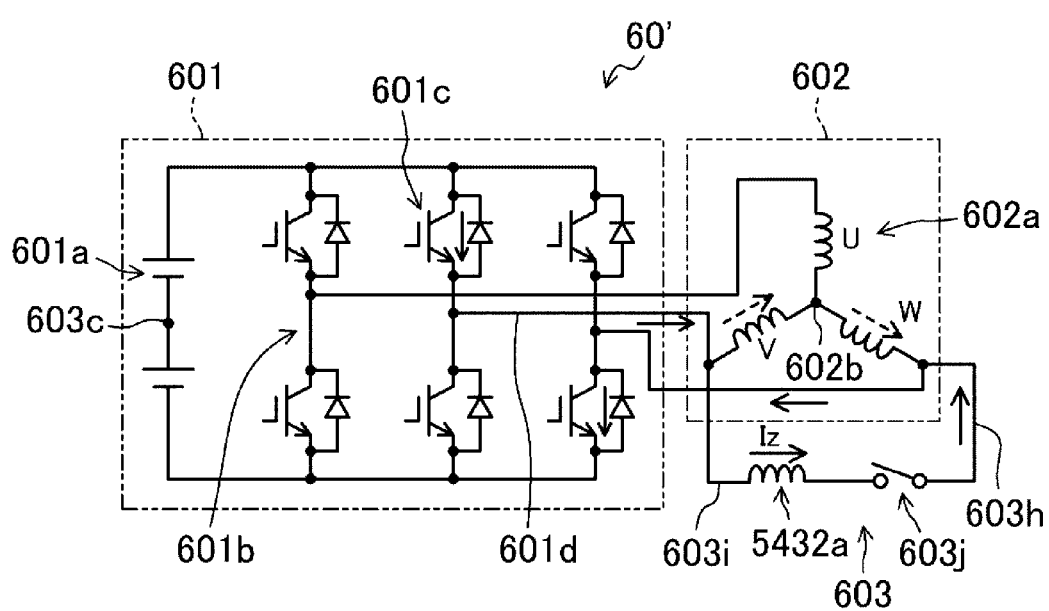
FIG. 15B is a schematic diagram illustrating another control circuit of the drive unit according to an embodiment of the disclosure.

In addition, FIG. 15B illustrates another configuration example of the control circuit. In a control circuit 60', the configuration of the clutch drive circuit 603 is changed in comparison with the control circuit 60 described above.

The clutch drive circuit 603 includes a clutch coil 5432a, a first wiring 603h, a second wiring 603i, and a relay 603j. One end of the clutch coil 5432a is connected to a connection portion with an output line 601d of any one coil group 602a among the three coil groups 602a through the first wiring 603h. The other end of the clutch coil 5432a is connected to the connection portion with the output line 601d of the other coil group 602a. The relay 603j is disposed on either side of the first wiring 603h and the second wiring 603i.

In the case of the control circuit 60', the clutch 54 may be driven by turning on and off the relay 603j. In this case, because the control circuit 60' is shared with the motor 52, it is possible to prevent the increase in the number of components and thus it is possible to prevent the increase in the manufacturing cost.

<Reduction of Impact Sound>

When the clutch 54 is switched, an impact sound is generated because the locking protrusions 542S and 542R and the hooking protrusions 5411S and 5411R come into contact with each other. The impact sound can be an unpleasant noise.

The impact sound caused by the switching of the clutch 54 may be classified into the following three types. The impact sound types include an impact sound (first impact sound) that is generated when a front end part of each locking protrusion 542S and 542R collides with a front end part of each hooking protrusion 5411S and 5411R in the state the locking protrusions 542S and 542R are not engaged with the hooking protrusions 5411S and 5411R, an impact sound (second impact sound) that is generated during each locking protrusion 542S and 542R is inserted into each hooking protrusion 5411S and 5411R, and an impact sound (third impact sound) that is generated during each locking protrusion 542S and 542R is completely engaged with each hooking protrusion 5411S and 5411R.

Among these first to third impact sounds, in particular, the first and third impact sounds tend to be an unpleasant noise. Therefore, in order to reduce such an impact sound, it is appropriate to provide an impact absorbing member, which is configured to reduce the impact sound, such as an elastic member or a vibration damping member at the connection portion between the slider 541 and the locking protrusions 542R and 542S on the rotor side and the stator side.

Particularly, a rubber or a plastic having the elasticity or vibration damping property may be installed at least any one of a part in which the locking protrusion 542S is provided and a part in which the hooking protrusion 5411S is provided, and at least any one of a part in which the locking protrusion 542R is provided and a part in which the hooking protrusion 5411R is provided. When the latter case is selected, the annular member 544 may be formed of an elastic member.

Alternatively, it is possible to perform the assembly while interposing the elastic member on at least any one of the part in which the locking protrusion 542S is provided and the part in which the hooking protrusion 5411S is provided, and at least any one of the part in which the locking protrusion 542R is provided and the part in which the hooking protrusion 5411R is provided. Therefore, the first and third impact sound may be reduced.

It is possible to reduce the impact sound through the study of the control of the clutch 54.

For example, immediately before the clutch controller 6b supplies the clutch 54 with a predetermined switching current (current for switching the clutch 54, corresponding to the above-described zero phase current Iz) to connect the slider 541 to the locking protrusions 542R and 542S, the clutch controller 6b supplies a current (impact relaxation current), which is an opposite direction to the switching current, to the clutch 54.

Particularly, referring to FIG. 14B, the switching of the clutch 54 is performed by sliding the slider 541 under the action of the driving forces T1 and T2 caused by the electromagnetic force. At this time, the detent torque is also applied. The detent torque is applied in the opposite direction to the driving forces P1 and P2, until the slider 541 crosses the neutral position. However, the detent torque is applied in the same direction as the driving forces P1 and P2 when the slider 541 crosses the neutral position.

Therefore, when the slider 541 crosses the neutral position, the slider 541 is slide by detent torque although the supply of the current to the clutch 54 is stopped. Therefore, the clutch 54 is switched. Then, the impact relaxation current is supplied to the clutch 54 at a certain timing (this timing represents "immediately before") from after the slider 541 reaches the neutral position until the slider 541 is connected to each of the locking protrusions 542R and 542S. The driving force in the reverse direction (indicated by arrow Pr in FIG. 14B) is generated.

Accordingly, the momentum of the slider 541 is alleviated and thus the impact sound may be reduced. This control is particularly effective for reducing the third impact sound.

Further, the voltage, which is applied to the clutch coil 5423a by the clutch controller 6b, may be controlled so that the driving force before the locking protrusions 542S and 542R are engaged with the hooking protrusions 5411S and 5411R is lower than that after the locking protrusions 542S and 542R are engaged with the hooking protrusions 5411S and 5411R.

Figure 16A:
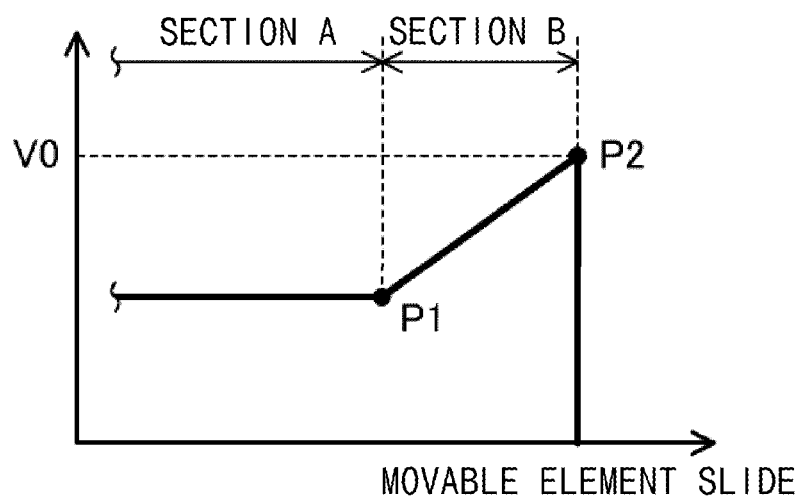
FIG. 16A is a view illustrating an example of a control for reducing an impact sound at the switching of the clutch according to an embodiment of the disclosure.

FIG. 16A illustrates an example of the control according to an embodiment of the disclosure. A solid line in FIG. 16A illustrates the relationship between the voltage applied to the clutch coil 5432a and the position of the movable element 5431 in the rotation axis direction relative to the fixed element 5432. The former is the vertical axis and the latter is the horizontal axis. V0 illustrates a voltage value normally applied to the clutch coil 5432a.

A section A is a section in which the locking protrusions 542S and 542R are not engaged with the hooking protrusions 5411S and 5411R, and a section B is a section in which the locking protrusions 542S and 542R are engaged with the hooking protrusions 5411S and 5411R.

A point P1 represents a position at which engagement between the locking protrusions 542S and 542R and the hooking protrusions 5411S and 5411R starts, and a point P2 represents a position at which the engagement between the locking protrusions 542S and 542R and the hooking protrusions 5411S and 5411R ends.

When the voltage applied to the clutch coil 5432a is lowered, the electromagnetic force generated in the fixed element 5432 is also reduced. Therefore, the driving force is weakened. As a result, in the section A, the driving force is weaker than usual, and the momentum of the slider 541 is suppressed. As a result, the first impact sound, which is generated when the engagement between the locking protrusions 542S and 542R and the hooking protrusions 5411S and 5411R starts, is reduced.

After each of the locking protrusions 542S and 542R is engaged with each of the hooking protrusions 5411S and 5411R, the voltage is increased to the normal voltage. FIG. 16A illustrates an example in which the voltage is gradually increased from the start to the end of the section B.

Figure 16B:
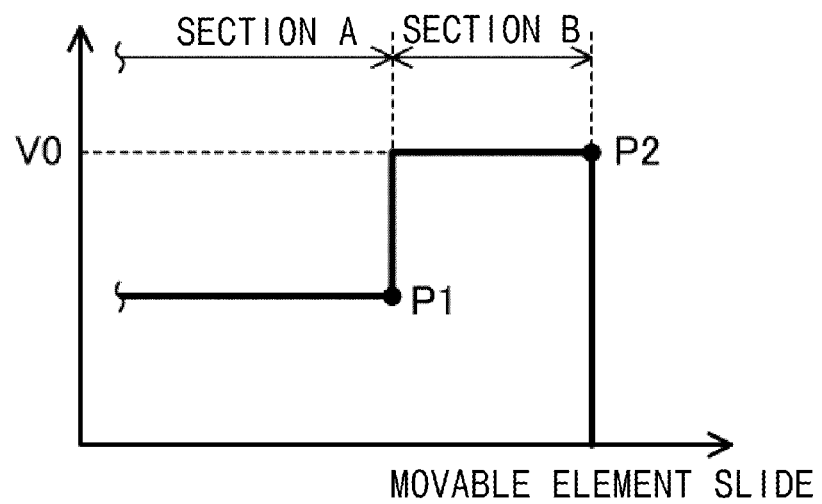
FIG. 16B is a view illustrating another example of the control for reducing the impact sound at the switching of the clutch according to an embodiment of the disclosure.

FIG. 16B is a view illustrating another example of the control for reducing the impact sound at the switching of the clutch according to an embodiment of the disclosure.

Referring to FIG. 16B, the voltage applied to the clutch coil 5423a may be instantly increased from the start of the section B to the normal voltage. By boosting the voltage, the driving force is recovered, and thus the clutch is quickly and stably switched.

<Details of Reducer 53>

Figure 17:
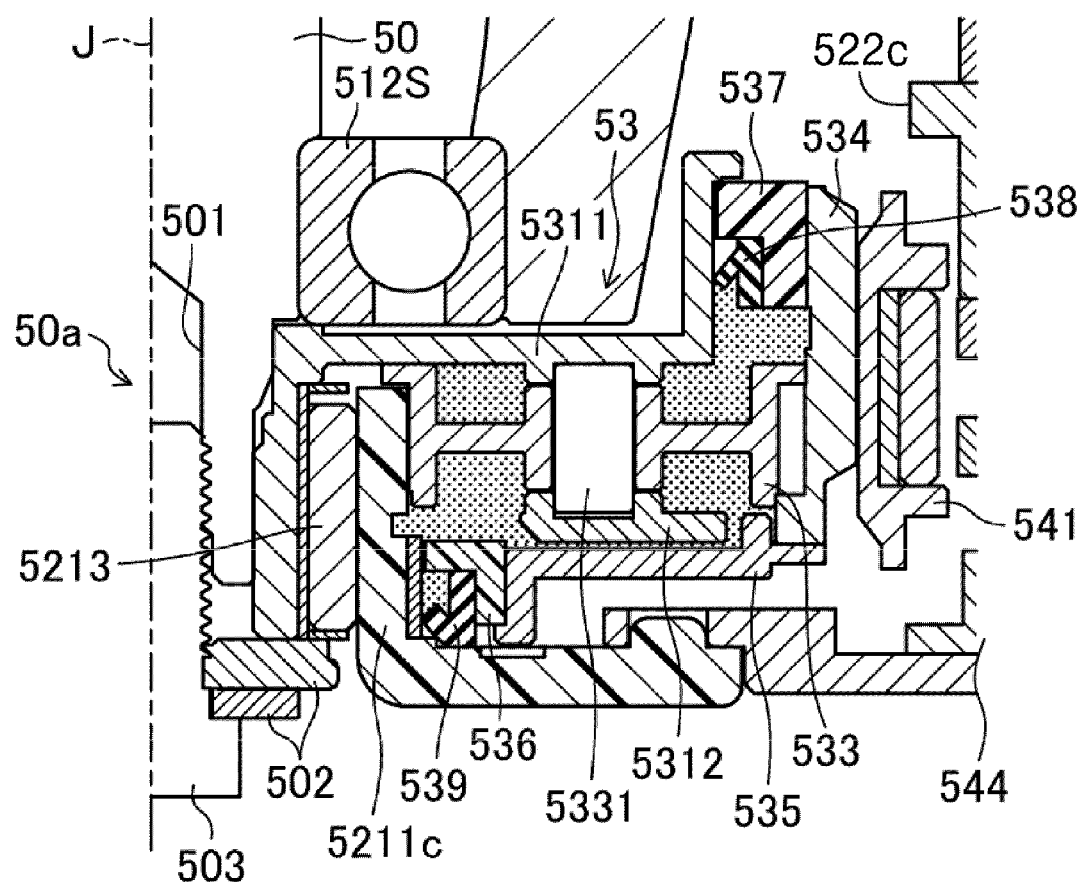
FIG. 17 is an enlarged view illustrating a part of the reducer according to an embodiment of the disclosure.

FIG. 17 is an enlarged view illustrating a part of the reducer according to an embodiment of the disclosure.

FIG. 17 illustrates an enlarged view of a part of the reducer 53. The vicinity of the reducer 53 is sealed and grease is injected therein.

Particularly, a ring-shaped first seal member 538 (elastic members such as rubber) is mounted below a sliding surface of the sliding member 537 (also referred to as a first sliding member 537) in contact with the carrier 531 (main frame 5311) in a rotatable state. As a result, the liquid is sealed between the carrier 531 and the first sliding member 537.

In addition, a ring-shaped second seal member 539 is mounted below a sliding surface of a sliding member 536 (also referred to as a second sliding member 536) fixed to the inside of the guide plate 535 and in contact with the rotor case 5211 (shaft support 5211*c*) in a rotatable state. As a result, the liquid is sealed among the guide plate 535, the second sliding member 536, and the rotor case 5211.

As a result, grease may be stably encapsulated inside the reducer 53, and the sun gear 5211*c*, the planetary gear 533, and the internal gear 534 may be smoothly rotated by lubrication of the grease.

Because the raw material of the first and second sliding members 536 and 537 may be cheap, a self-lubricating resin is appropriate. In this case, it is appropriate to improve lubricity by giving hard plating to the facing surface of the sliding surface. In addition, the first and second sliding members 536 and 537 may be installed and thus the sliding portion may be provided with a ball bearing.

It is appropriate that a material of the main frame 5311 is aluminum (aluminum die casting). In this case, it is appropriate to perform alumite treatment on a part in contact with the sliding surface of the first sliding member 537.

<Modification Example of Bearing Portion>

In the above-mentioned embodiment, as for the drive unit 5, the rotor bearing portion configured to rotatably support the rotor 521 against the shaft 50 is implemented by a single oil impregnated bearing 5213. However, the rotor bearing portion is not limited thereto, and thus the rotor bearing portion may be modified according to the specifications.

For example, a rotor bearing portion may be implemented by a pair of ball bearing. Particularly, instead of the oil impregnated bearing 5213, a pair of ball bearings may be interposed between the shaft support 5311*b* of the carrier 531 and the shaft support 5211*c* of the rotor case 5211.

Each ball bearing is arranged at a position away from the rotation axis direction. The ball bearing is provided with a pressurization mechanism, and a constant pressurization may be applied to the ball bearing through pressurization mechanism.

In this case, one of the pair of ball bearings may be an oil impregnated bearing. In general, the oil impregnated bearing is suitable for high speed rotation, but in the case of the drive unit 5, the rotor bearing portion is not rotated in the second mode of rotating at high speed. Therefore, even if the oil impregnated bearing is used in the rotor bearing portion, the reliability of the bearing portion may be improved.

In addition, the disclosed technology is not limited to the above-described embodiments, and may include various other configurations.

For example, although the embodiment illustrates a drum type washing machine, it is also applicable to a vertical washing machine. Moreover, although the outer rotor type motor in which the magnet of the rotor is located on the outside of the stator is illustrated, it may be an inner rotor type motor in which the magnet of the rotor is located inside the stator.

The number of magnetic poles of the clutch magnet 5431*b* is not limited to three, but may be four or more. As a result, points which are magnetically stabilized may be four or more.

As is apparent from the above description, it is possible to implement a drive unit suitable for driving a washing machine, and further, it is possible to provide a washing machine excellent in convenience.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A washing machine comprising:
   a body;
   a fixed tub installed inside the body;
   a rotating tub rotatably disposed in the fixed tub to accommodate laundry; and
   a driver configured to rotate the rotating tub;
   wherein the driver comprises:
      a shaft connected to a bottom of the rotating tub to rotate the rotating tub about a rotation axis,
      a motor comprising a stator and a rotor configured to be rotatable through interaction with the stator,
      a reducer configured to connect the rotor to the shaft and to rotate the shaft, and
      a clutch configured to be switchable between a first mode and a second mode,
   wherein, in the first mode, the motor reduces speed through the reducer and rotates the shaft at a reduced speed,
   wherein, in the second mode, the motor rotates the shaft without reducing speed,
   wherein the reducer and the clutch are arranged between the shaft and the motor,
   wherein the rotor comprises a rotor case and a plurality of magnets, and
   wherein the plurality of magnets is arranged to face an outer circumferential portion of the stator.

2. The washing machine of claim 1, wherein the reducer, the clutch, and the motor are arranged in a line along a direction perpendicular to the rotation axis.

3. The washing machine of claim 1,
   wherein the rotor case comprises:
      a disk-shaped bottom wall in which a center thereof coincides with the rotation axis, and
      a cylindrical circumferential wall extending around the bottom wall, and
   wherein the stator, the reducer, and the clutch are accommodated in the rotor case.

4. The washing machine of claim 3, wherein the rotor case comprises a shaft support rotatably supported on the shaft through a rotor bearing portion.

5. The washing machine of claim 1, further comprising:
   at least one processor,
   wherein the at least one processor is configured to:
      control the driver to perform each process of washing, rinsing, and dehydration,
      control the clutch to switch into the first mode in the washing and rinsing process, and control the clutch to switch into the second mode in the dehydration process.

6. The washing machine of claim 1, wherein the reducer comprises:
   a carrier fixed to the shaft;
   a sun gear to pivot about the rotation axis;
   an internal gear arranged around the sun gear; and
   a plurality of planetary gears rotatably supported by the carrier to be arranged between the sun gear and the internal gear to be engaged with the sun gear and the internal gear.

7. The washing machine of claim 6, wherein the clutch comprises:
   a movable portion slidable in a rotation axis direction;
   a pair of fixed portions spaced apart in the rotation axis direction; and
   an actuator to switch between the first mode and the second mode by connecting the movable portion to any one of the pair of fixed portions.

8. The washing machine of claim 7, wherein the pair of fixed portions comprises:
   a first fixed portion fixed to the stator; and
   a second fixed portion fixed to the rotor.

9. The washing machine of claim 7,
   wherein the movable portion is formed of a cylindrical member having a diameter larger than that of the internal gear, and
   wherein the movable portion is arranged on an outside of the internal gear to be slidable in the rotation axis direction.

10. The washing machine of claim 7,
    wherein the pair of fixed portions each comprises a pair of locking protrusions protruding in the rotation axis direction, and
    wherein the movable portion comprises a pair of hooking protrusions formed to be spaced apart in the rotation axis direction to be engaged with the pair of locking protrusions.

11. The washing machine of claim 10, wherein the clutch comprises a position selector configured to allow the fixed portion and the movable portion to be placed on a predetermined position in a circumferential direction where the locking protrusion is engaged with the hooking protrusion.

12. The washing machine of claim 7,
    wherein the actuator comprises:
       a movable element provided on the movable portion, the movable element including a clutch magnet, and
       a fixed element provided to face the movable element with a gap therebetween in a diameter direction, the fixed element including a clutch coil and a clutch yoke, and
    wherein the clutch magnet includes a plurality of magnetic poles arranged in the rotation axis direction.

13. The washing machine of claim 12, further comprising:
    a first stable point in which the movable element is magnetically stabilized on a first side of a connection portion where the movable portion is connected to the fixed portion; and
    a second stable point in which the movable element is magnetically stabilized on a second side of the connection portion,
    wherein the first stable point and the second stable point are generated based on a current not being supplied to the clutch coil.

14. The washing machine of claim 7, further comprising:
    at least one processor configured to control the motor and the clutch,
    wherein the at least one processor comprises:
       a motor controller configured to control driving of the motor, and
       a clutch controller configured to control driving of the clutch,
    wherein immediately before the clutch controller controls supply of a predetermined switching current to the clutch to connect the movable portion to the fixed portion, and
    wherein the clutch controller controls supply of an impact relaxation current, which is an opposite direction to the switching current, to the clutch.

15. A driver for a washing machine comprising:
    a shaft connected to a bottom of a rotating tub of the washing machine to rotate the rotating tub about a rotation axis;
    a motor comprising a stator and a rotor configured to be rotatable through interaction with the stator;
    a reducer configured to connect the rotor to the shaft and to rotate the shaft; and
    a clutch configured to be switchable between a first mode and a second mode,
    wherein, in the first mode, the motor reduces a speed through the reducer and rotates the shaft at a reduced speed,
    wherein, in the second mode, the motor rotates the shaft without reducing speed,
    wherein the reducer and the clutch are arranged between the shaft and the motor,
    wherein the rotor comprises a rotor case and a plurality of magnets, and
    wherein the plurality of magnets is arranged to face an outer circumferential portion of the stator.

16. The driver of claim 15, wherein
    the reducer, the clutch, and the motor are arranged in a line along a direction perpendicular to the rotation axis.

17. The driver of claim 15,
    wherein the rotor case comprises:
       a disk-shaped bottom wall in which a center thereof coincides with the rotation axis, and
       a cylindrical circumferential wall extending around the bottom wall, and
    wherein the stator, the reducer, and the clutch are accommodated in the rotor case.

18. The driver of claim 15,
    wherein the reducer comprises:
       a carrier fixed to the shaft;
       a sun gear to pivot about the rotation axis;
       an internal gear arranged around the sun gear; and
       a plurality of planetary gears rotatably supported by the carrier to be arranged between the sun gear and the internal gear to be engaged with the sun gear and the internal gear, and
    wherein the clutch comprises:
       a movable portion slidable in a rotation axis direction;
       a pair of fixed portions spaced apart in the rotation axis direction; and
       an actuator to switch between the first mode and the second mode by connecting the movable portion to any one of the pair of fixed portions.

* * * * *